United States Patent [19]
Soumiya et al.

[11] Patent Number: 5,341,366
[45] Date of Patent: Aug. 23, 1994

[54] CONNECTION ADMISSION CONTROL SYSTEM

[75] Inventors: Toshio Soumiya; Shunji Abe; Masafumi Katoh; Naotoshi Watanabe, all of Kawasaki, Japan

[73] Assignee: Fujitsu Limited, Kawasaki, Japan

[21] Appl. No.: 32,113

[22] Filed: Mar. 17, 1993

[30] Foreign Application Priority Data

Mar. 18, 1992 [JP] Japan .................................. 4-061673
Mar. 25, 1992 [JP] Japan .................................. 4-067414
Sep. 18, 1992 [JP] Japan .................................. 4-249974
Oct. 8, 1992 [JP] Japan .................................. 4-270184

[51] Int. Cl.$^5$ ........................... H04J 3/12; H04J 3/14; H04L 12/24; H04L 12/56
[52] U.S. Cl. ..................... 370/17; 370/60.1; 370/94.2
[58] Field of Search ............... 370/13, 17, 60, 60.1, 370/94.1, 94.2, 110.1

[56] References Cited

U.S. PATENT DOCUMENTS 5,119,367 6/1992 Kawakatsu et al. ................... 370/60
5,189,667 2/1993 Esaki et al. ............................. 370/60
5,199,027 3/1993 Barri ..................................... 370/60.1
5,231,631 7/1993 Buhrke et al. ......................... 370/60

*Primary Examiner*—Wellington Chin
*Attorney, Agent, or Firm*—Staas & Halsey

[57] ABSTRACT

In an ATM switching system responsive to a call setup request from each of B-ISDN terminals, a band for an accepted call is estimated in accordance with fuzzy decision on the basis of the fact that the network traffic characteristics can be determined empirically. Therefore, it is possible to estimate the band without any complicated band estimation calculations, improve the call acceptance processing response speed, and further improve the availability efficiency of the network transmission line. In the consequents of the fuzzy rules in particular, the respective band estimation values are represented by the respective input functions, or particularly by the linear couplings coupled by predetermined linear parameters of respective Inputs, thus improving the descriptive capacity of the rules.

29 Claims, 30 Drawing Sheets

FIG. 30

$a_{j,k}$ ($1 \leq j \leq 16, 1 \leq k \leq 5$)

| j \ k | 1 | 2 | 3 | 4 | 5 |
|---|---|---|---|---|---|
| 1 | $P_1a$ | $P_2a$ | $P_3a$ | $P_4a$ | 0.0 |
| 2 | $P_1a$ | $P_2a$ | $P_3a$ | $P_4p$ | 0.0 |
| 3 | $P_1a$ | $P_2a$ | $P_3p$ | $P_4a$ | 0.0 |
| 4 | $P_1a$ | $P_2a$ | $P_3p$ | $P_4p$ | 0.0 |
| 5 | $P_1a$ | $P_2p$ | $P_3a$ | $P_4a$ | 0.0 |
| 6 | $P_1a$ | $P_2p$ | $P_3a$ | $P_4p$ | 0.0 |
| 7 | $P_1a$ | $P_2p$ | $P_3p$ | $P_4a$ | 0.0 |
| 8 | $P_1a$ | $P_2p$ | $P_3p$ | $P_4p$ | 0.0 |
| 9 | $P_1p$ | $P_2a$ | $P_3a$ | $P_4a$ | 0.0 |
| 10 | $P_1p$ | $P_2a$ | $P_3a$ | $P_4p$ | 0.0 |
| 11 | $P_1p$ | $P_2a$ | $P_3p$ | $P_4a$ | 0.0 |
| 12 | $P_1p$ | $P_2a$ | $P_3p$ | $P_4p$ | 0.0 |
| 13 | $P_1p$ | $P_2p$ | $P_3a$ | $P_4a$ | 0.0 |
| 14 | $P_1p$ | $P_2p$ | $P_3a$ | $P_4p$ | 0.0 |
| 15 | $P_1p$ | $P_2p$ | $P_3p$ | $P_4a$ | 0.0 |
| 16 | $P_1p$ | $P_2p$ | $P_3p$ | $P_4p$ | 0.0 |

CONNECTION ADMISSION CONTROL SYSTEM

BACKGROUND OF THE INVENTION

1. Field of the Invention

The present invention relates to a connection admission control system and more particularly, to a connection admission control system based upon fuzzy control.

2. Description of the Related Art

A broadband ISDN (Integrated Service Digital Network) has been researched and developed as a next generation communications network by which all the communications services (voice, data, moving image, etc.) can be integrated. ATM (Asynchronous Transfer Mode) is a technique for converting all the information into fixed information (referred to as cells) for enabling higher information transfer, irrespective of the continuous information such as moving image, the occurrence of burst information such as data, and the respective communication speed thereof.

However, since the ATM processes the various traffics of different information speeds and different burst conditions (the status in which a great amount of information occurs momentarily) in the respective services, in particular when the traffics of high burst conditions are mixed with each other, there exists a problem in that it is impossible to provide a service quality (e.g., with respect to the cell disuse ratio, delay, etc.) required by the user. Accordingly, it has become necessary to provide any control system for accepting or rejecting an incoming call, in order to secure the high service quality required by the users.

FIG. 4 is a schematic block diagram showing a prior art variable speed communication system. In the drawing, the system is composed of a plurality of B-ISDN terminals (B-TE), an ATM switching system 2 constructed by ATM switches 2a, and a central control unit (CC) 10 connected to the ATM switch system 2 to control the switching operation of the ATM switches 2a. Further, traffic parameters are stated (reported) to the central control unit 10 by the B-ISDN (wide bond) terminals 1 (referred to as users or subscribers).

In the system as described above, the control procedure to a call is as follows: when the user first states the traffic parameters such as a maximum speed, an average speed, etc. of the communication service now requested, on the side of the ATM switching system 2 the central control unit 10 calculates an estimated band which satisfies the user's communication service quality (the cell disuse ratio, the cell transfer delay, etc.) on the basis of the stated parameters and in accordance with complicated calculations. Further, if the estimated band can be accommodated in a currently idle band of the transmission line, the system accepts the call. However, if not accommodated, the call is rejected.

FIGS. 5(a) and (b) are illustrations for assistance in explaining the call allocating method, in which FIG. 5(a) is an example of fixed allocation and FIG. 5(b) is an example of variable allocation. In these figures, transmission line speeds (bandwidth) are allocated within the width of the XMSN transmission line 3. In the case of the fixed allocation method as shown in FIG. 5(a), four channels of A to D are allocated, for instance. In this system, since the bandwidth are fixedly allocated, there exists a problem in that the degree of freedom of the band availability is small and therefore it is impossible to use the transmission line effectively.

In contrast with this, in the case of the variable allocation method as shown in FIG. 5(b), since the used band varies for each channel as shown, the statistical multiplex communications are enabled in such a way that the crest of a channel overlaps with a trough of the other channel, so that it is possible to allocate an additional channel E to the same transmission line, thus improving the availability of the transmission line.

However, where the statement of the traffic parameters and the estimation of the band are executed strictly, there exists another problem in that a huge calculation time is inevitably required. FIG. 6 is a graphical representation showing the traffic characteristics of the system, in which the number of calls of the same sorts is taken on the abscissa and the band is taken on the ordinate. In the drawing, P denotes the stated peak band value, and Vm denotes the stated averaged band value. In practice, however, the band characteristics become as shown by the curve f in FIG.6. In other words, there exists a non-linear range in which the peak value p changes to the average value VM between the area (where the number of calls n is small) and the area (where the number of calls is large). Therefore, when this non-linear range is required to obtain as the estimated band, various complicated calculations are necessary as already described.

As the method of calculating the estimation band, a statistical method based upon a binomial distribution approximation is known as disclosed by "Call Acceptance Control System in ATM Switching Network" 1990 Preliminary Manuscript Collection of Great Spring Meeting of Electronic Information Communications Society, 3-421 pages SB-7-6, for instance.

In addition, techniques of adopting the fuzzy theory to a communication network are disclosed by 1991 Preliminary Manuscript Collection of Autumn Meeting of Electronic Information Communications Society and Electronic Information Communications Society Transactions B-1 Vol. J72-B-I No.7 pp 555-563 (July, 1989), for instance.

However, after the traffic parameters have been stated, when the band is estimated strictly in accordance with these methods, a huge calculating time is required and thereby constitutes a hindrance to the switching processing.

To overcome this problem, it is possible to estimate the band in accordance with a more simple method of calculating the band estimation value by use of traffic parameters simple to some extent. In the simple method of calculating the band estimation, however, since the band is not estimated strictly and therefore set to the more safer numerical value for securing the service quality, there raises another problem In that the estimated band occupies the band more than necessary, thus decreasing the efficiency in availability of the transmission line.

On the other hand, although there exists an attempt to execute the connection admission control in accordance with the fuzzy theory, as described above, it has been so far not clear as to practical means for controlling the connection admission and the practical system configuration thereof.

SUMMARY OF THE INVENTION

With these problems in mind, therefore, it is the object of the present invention to provide a connection admission control system based upon fuzzy control, by which when communication information of various characteristics such as voice, data, moving image, etc. is converted into a fixed length packet (referred to as a cell) and further the connection admission is controlled by using an ATM switching system in a B-ISDN (Broader-band ISDN) for enabling integrated communications in a network, the service quality for connection request call can be satisfied on the basis of the traffic parameters stated by the user and in accordance with the fuzzy control without any communications congestion.

FIG. 1 is a block diagram showing a principle of the present invention, which comprises a plurality of B-ISDN terminals (B-TE) 1, ATM switching unit 2 connected to the B-ISDN terminals 1 and composed of high speed devices, and call processing unit 10 for processing call in cooperation with the ATM switching unit 2.

The call processing unit 10 comprises call acceptance control unit 12 for accepting the statement of traffic parameters transmitted from the B-ISDN terminal 1, and fuzzy control unit 11 for inferring a serviceable band of the accepted call on the basis of the fuzzy theory.

The fuzzy control unit 11 receives traffic parameters from the user (B-ISDN terminal 1) through the acceptance control unit 12, and obtains serviceable bandwidth for the respective calls on the basis of the fuzzy calculation in order to execute the connection admission control, while satisfying the service quality to the connection request calls and preventing communications congestion. Accordingly, the present invention can provide a connection admission control system using fuzzy control which can improve the availability of the transmission path.

In the present invention, the fuzzy control is applied to the connection admission control system of the ATM switching system. The fuzzy control is based upon the fuzzy set by which ambiguity is expressed quantitatively on the basis of set concept. The fuzzy control can be considered as an expert system in control, because work or jobs so far achieved by only skilled persons having a wealth of knowledge and experience can be expressed by words qualitatively and logically in accordance with if-then type fuzzy control rules.

As already explained, one of the reasons why the band estimation is difficult In the ATM switching system is the traffic fluctuations due to burst superposition. This phenomenon is not found in the prior art line switching system in STM (Synchronous Transfer Mode) for allocating a band fixedly according to the information quantity, and therefore the method of analyzing this phenomenon is not yet so far established.

However, the traffic characteristics can be known empirically to some extent by calculation simulation, or other. For example, the following four traffic characteristics have been known empirically.

(1) With respect to the average speed and the maximum speed determined on the basis of the statement values of the subscribers (B-ISDN terminals), it is possible to allocate a new band at the average speed, when the ratio of (average speed/maximum speed) is small; that is, the burst characteristics are low.

(2) With respect to the maximum speed decided on the basis of the transmission line speed and the values stated by the subscribers, it is possible to allocate a new band at the average speed, when the ratio of (maximum speed/transmission line speed) is low; that is, the band of the service for the new communications is narrower as compared with the band of the transmission line and further the multiplex rate is higher in the transmission line.

(3) It is possible to allocate the band at the average speed, when the square fluctuation coefficient indicative of communications fluctuations is small. The square fluctuation coefficient value is about 1 in the case of digital sound, but as high as 20 to 100 when the burst condition is high.

(4) It is possible to allocate the band at the average speed, when the number of the multiplex calls of the same quality class increases.

In the present invention, the above-mentioned traffic characteristics are analyzed logically on the basis of the if-then fuzzy control rules, and the necessary band is calculated for the band estimation in accordance with the above-mentioned control rules.

According to the present invention, the band at the call acceptance is estimated in accordance with the fuzzy rule decision on the basis of the fact that the traffic characteristics of the network can be determined empirically, with the result that it is possible to estimate the band, without depending upon a plurality of complicated band estimation calculations.

Consequently, a high response call acceptance processing is enabled, and therefore it is possible to improve the availability efficiency of the transmission line of the network.

In particular, in the present invention, the respective band estimation values are represented by the linear couplings (coupled by the respective input functions, in particular by the predetermined linear parameters of the respective inputs) in the consequent of the fuzzy rules, so that it is possible to improve the ability of rule description.

In addition, the membership functions of the respective fuzzy variables in the antecedent of the respective fuzzy rules and the respective linear parameters in the consequent of the respective fuzzy rules are decided empirically on the traffic conditions of the network, so that it is possible to estimate the bandwidth at high accuracy.

BRIEF DESCRIPTION OF THE DRAWINGS

FIG. 30 is a table listing the practical examples of aj,k in the embodiment 6;

DETAILED DESCRIPTION OF THE PREFERRED EMBODIMENTS

Prior to the description of the embodiments of the present invention, the if-then fuzzy control rules adopted in the present invention will be explained simply hereinbelow.

A case will be described with reference to FIG. 12, where a fuzzy mode is based upon the if-then rules as follows:

if X1 is small then Y is large if X2 is large then Y is small

Here, the rate (grade value) at which the actual input variable value X1 belongs to "small" is defined as the adaptability of rule 1; and the rate (grade value) at which the actual input variable value X2 belongs to "large" is defined as the adaptability of rule 2. In this case, the inferred result value can be obtained as a center of gravity of a graph (membership functions of the consequent) obtained by weighing the grade value graphs of the membership functions "large" and "small" of the output variables Y by the adaptabilities of the rules 1 and 2, and by adding these graphs.

Embodiment 1

A first embodiment of the present invention will be described hereinbelow with reference to the attached drawings.

Figure 1:
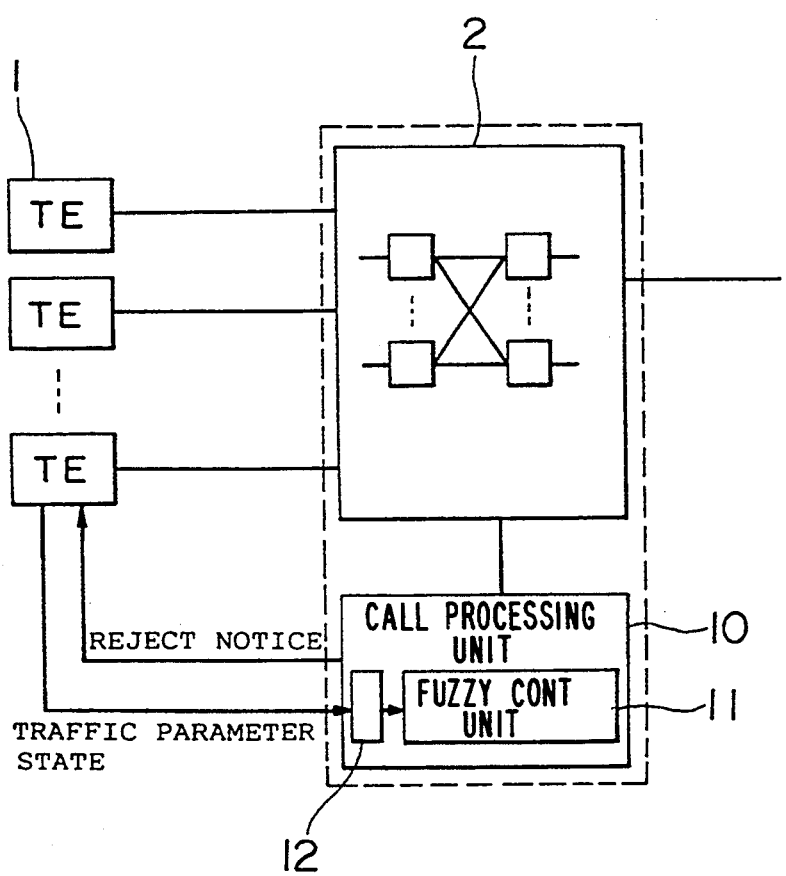
FIG. 1 is a block diagram showing the principle of the system of the present invention.

FIG. 1 is a block diagram showing a principle of the control system of the present invention, which comprises a plurality of B-ISDN terminals (B-TE) 1, ATM switching unit connected to the B-ISDN terminal 1 and composed of light switches, and call processing unit 10 for processing calls in cooperation with the ATM switching unit 2.

The call processing unit 10 comprises call acceptance control unit 12 for accepting the statement of traffic parameters transmitted from the B-ISDN terminal 1, and fuzzy control unit 11 for inferring a serviceable band of the accepted call on the basis of the fuzzy theory.

The fuzzy control unit 11 receives traffic parameters from the users (B-ISDN terminal 1) through the connection admission control unit 12, and calculates the serviceable bandwidth for the respective calls on the basis of the fuzzy calculation in order to execute the connection admission control, while satisfying the service quality to the connection request calls and preventing communications congestion. Accordingly, the present invention can provide a connection admission control system using the fuzzy control which can improve the availability of the transmission line.

Figure 2:
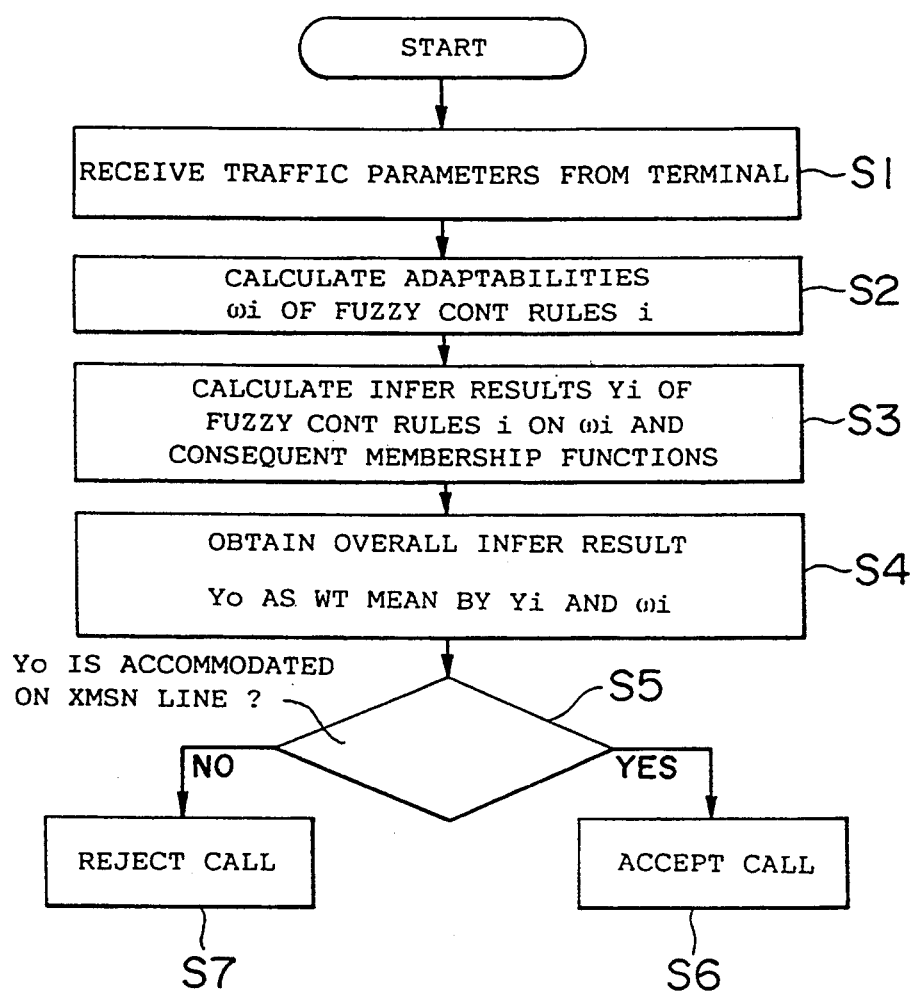
FIG. 2 is a flowchart showing the basic operation of the embodiment 1 of the present invention.

FIG. 2 is a flowchart showing the operation of the fuzzy control unit 11 of the control system of the present invention.

First, control receives traffic parameters from the B-ISDN terminal 1 (in step S1). Successively, control calculates the adaptabilities $\omega i$ of the fuzzy control rules (in step S2). Further, control calculates the inferred results yi of the fuzzy control rules on the basis of the adaptabilities $\omega i$ and the membership functions of the consequent (the rear stage of if-then) (in step S3). Then, the overall inferred result yo is obtained as the weighted mean by yi and $\omega i$ (in step S4). Further, control checks whether the inferred result yo can be accommodated in the transmission line (in step S5). If accommodated, control accepts the call (in step S6); and if not accommodated, control rejects the call (in step S7).

The embodiment 1 of the present invention described above with reference to the flowchart shown in FIG. 2 will be described in further detail with reference to FIGS. 3 in more practical way.

Figure 3A:
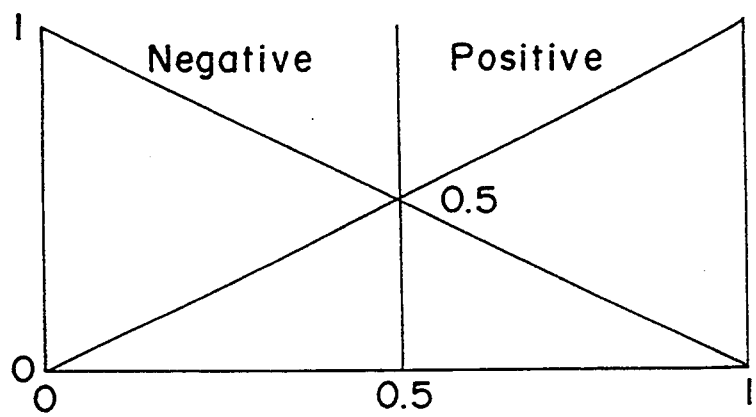
FIG. 3(a) and 3(b) are graphical representations showing membership functions used for the present invention.

FIG. 3(a) represents liner type membership functions used for this embodiment, and (b) represents arc tangent type membership functions, in each of which the fuzzy set is standardized within a section [0, 1], and the numerical values from 0 (the minimum value) to 1 (the maximum value) referred to as grade are taken on the ordinate.

Practical Example

The maximum and average speeds of the new communication service now being made are stated by the user as the traffic parameters. The following fuzzy control rules are adopted, where x1 denotes the numerical value $x1 = 1/m$ indicative of the grade of the number m of the multiplex calls of the same quality class, and x2 denotes the ratio of (maximum speed)/(minimum speed). Here, when the rules denoted by R1 and R2 can be expressed as follows:

R1: if x1 is N1 and x2 is N2 then y is P

R2: if x1 is P1 and x2 is P2 then y is N where N1, P1, N1, P2, N and P are values of the linear membership functions shown in FIG. 3(a), and the abscissa is x.

Where the maximum speed $Vp = 1$ Mb/s, the average speed $Va = 0.5$ Mb/s, the number of multiplex calls $m = 20$ and the transmission line speed $Vt = 156$ Mb/s, $$x1 = 1/20 = 0.05$$

$$x2 = 1/156$$

First, the adaptabilities of the antecedent of the respective rules (front stage of if-then) are obtained. When the adaptabilities of the rules R1 and R2 are denoted as $\omega 1$ and $\omega 2$, respectively, $$\begin{aligned}\omega 1 &= N1\ (x1)\ VN2\ (x2) \quad \text{[Formula 5]}\\ &\max [N1\ (0.05), N2\ (1/156)]\\ &\max [0.95, 0.99359]\\ &= 0.099359\end{aligned}$$

$$\begin{aligned}\omega 2 &= P1\ (x1)\ VP2\ (x2) \quad \text{[Formula 6]}\\ &\max [P1\ (0.05), P2\ (1/156)]\\ &\max [0.05, 1/156]\\ &= 0.05\end{aligned}$$

where it is possible to read the values of N(1), N(2), P(1) and P(2) from the characteristics shown in FIG. 3(a).

Successively, the inferred results of the respective rules are obtained. When the inferred results of the rules R1 and R2 are denoted as y1 and y2, $$y1 = N - 1(\omega 1) = N - 1(0.99359) = 1/156$$

$$y2 = P - 1(\omega 2) = P - 1(0.05) = 0.05$$

Further, when the overall inferred result is defined as y0, the y0 can be expressed as the weighted mean by the adaptabilities $\omega 1$ and $\omega 2$ of the y1 and y2 as follows:

$$\begin{aligned}y0 &= (\omega 1 \cdot y1 + \omega 2 \cdot y2)/(y1 + y2) \quad \text{[Formula 7]}\\ &= \{(0.99359/156) + (0.05\ 0.05)\}/\{(1/156) + 0.05\}\\ &= 0.15723\end{aligned}$$

Since the membership functions of the consequent are standardized within the section [0, 1], when converted into the actual band allocation value, the y0 can be expresses as $$\begin{aligned}V &= Va + y0 \cdot Vp = 0.5 + 0.15723 * 1\\ &= 0.65723\ \text{Mb/s}\end{aligned}$$

When the total value of the call allocation values $Vp = 1$ Mb/s, $Va = 0.5$ Mb/s of the same quality class is changed to 0.65723*21 (the number of multiplex calls of the same quality class is increased by 1 than 20) = 13.8 Mb/s, if the this value is accommodated in the transmission line of the during communications, this call is accepted. However, if not accommodated, this call is rejected. If accepted, the total value of the band allocation values of the quality class of the accepted call is updated to 12.4 Mb/s.

Figure 3B:
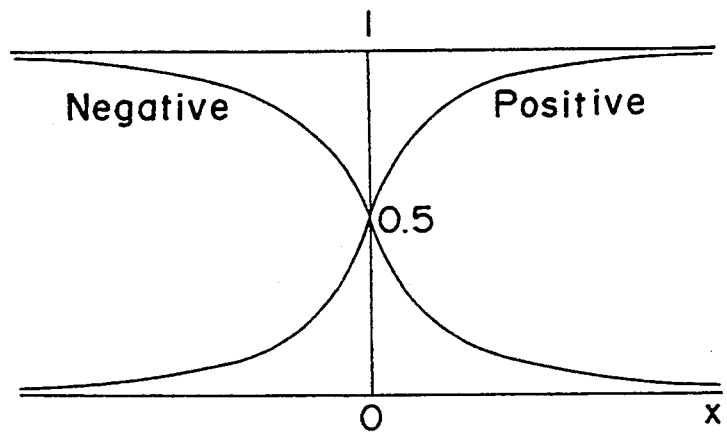
Figure 4:
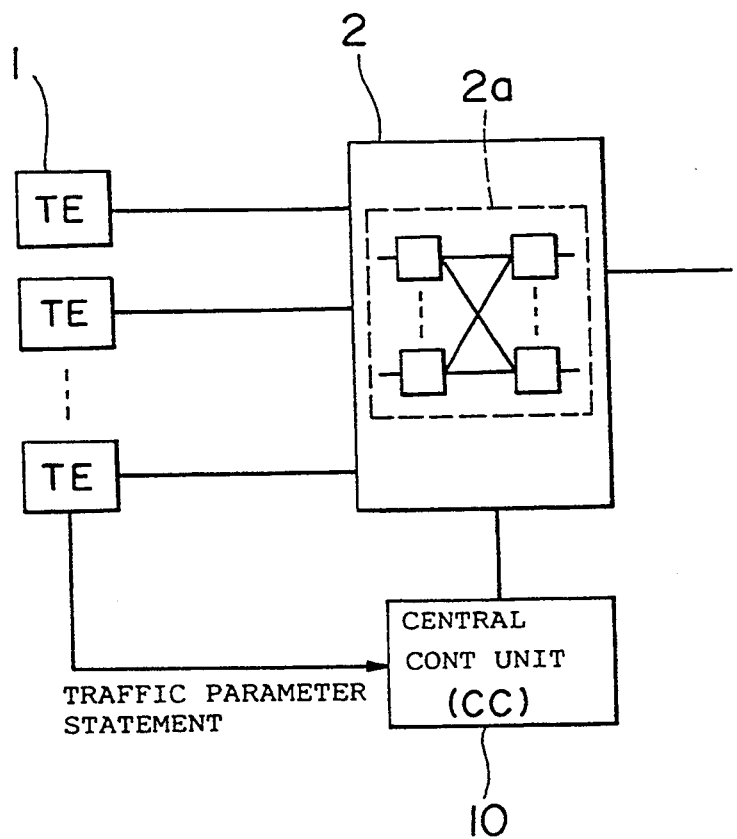
FIG. 4 is a schematic block diagram showing the prior art system.
Figure 5A:
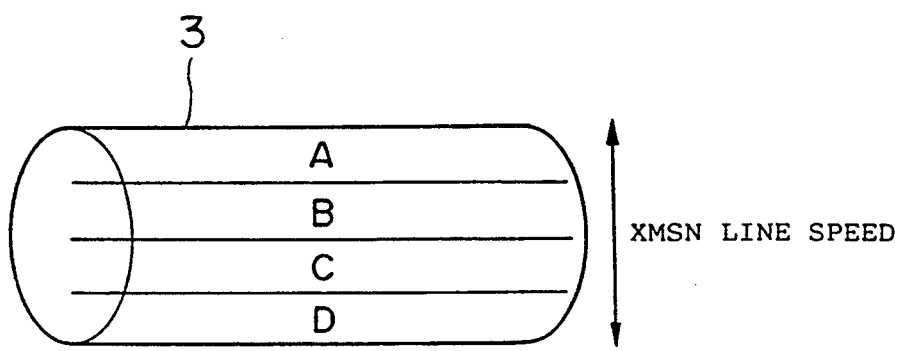
FIGS. 5(a) and (b) are Illustrations for assistance in explaining the call allocation.
Figure 5B:
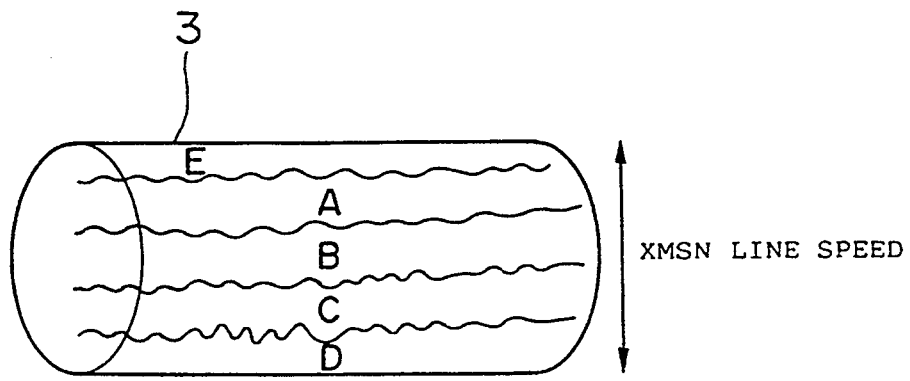
Figure 6:
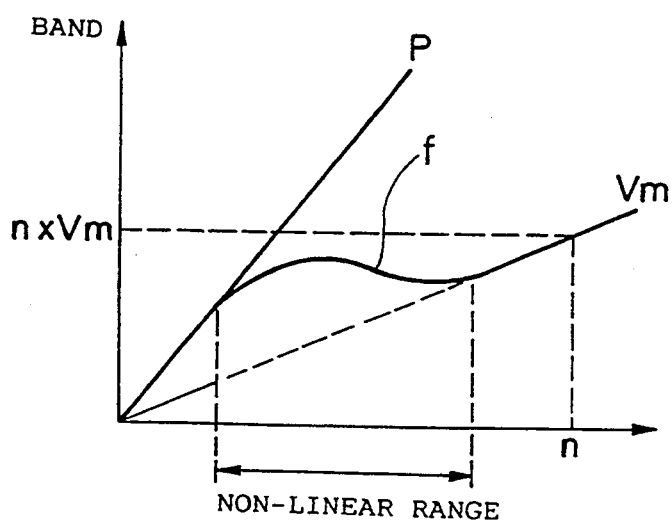
FIG. 6 is a graphical representation showing the traffic characteristics.

In the above-mentioned embodiment 1, the linear type membership functions as shown in FIG. 3(a) are adopted. Without being limited thereto, it is of course possible to use the arc tangent type membership functions as shown in FIG. 3(b). Further, it is possible to change the type of these membership functions as occasion demands.

EMBODIMENT 2

Figure 7:
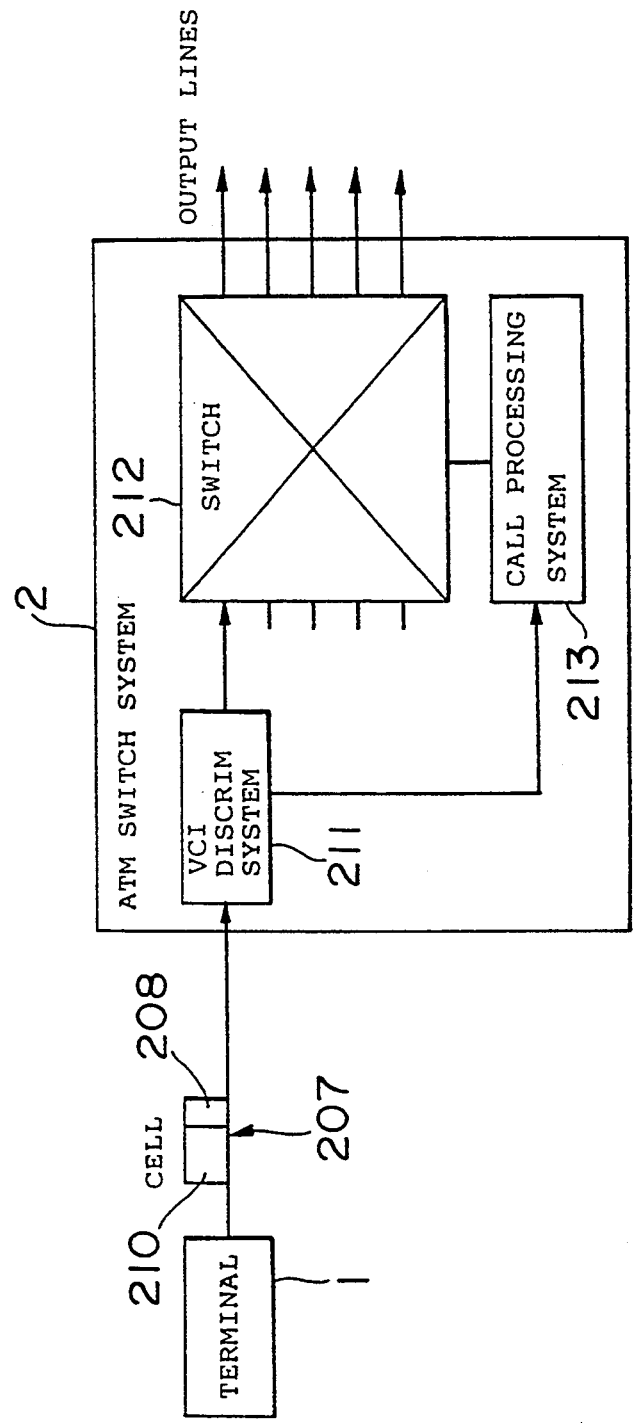
FIG. 7 is a block diagram showing an ATM switching system and an B-ISDN terminal connected to this switching system.

FIG. 7 is a block diagram showing the ATM switching system and the B-ISDN terminal connected thereto.

The ATM switching system 2 functions as a call node and a window for accepting a call setup request from the B-ISDN terminal 1 to the network.

In this embodiment 2, the call setup request, the voice information, image Information, etc. from the B-ISDN terminal 1 are transmitted through the lines in the form of cells. A cell 207 is composed of a header 208 for storing line information such as channel information (VCI), line information (VPI), etc.; and an information field 210 for storing voice information, image information, etc.

The call setup request is effected when the user sends the cell 207 (in which the traffic parameters such as the maximum speed value and the average speed value of the communication service now requested by the user are stored) from the B-ISDN terminal 1 to the ATM switching system 2 of the call node.

The ATM switching system 2 is composed of a VCI discriminating system 211, a switch 212 and a call processing system 213.

The VCI system 211 is provided with the function for switching the line information stored In the header 208 of the cell 207; that is, in practice with a VCI header rewriting table (not shown). When the header 208 of the input cell 207 is rewritten on the basis of the contents described in this table, it is possible to Introduce the cell 207 to any line (an output line) through the switch 212.

Figure 8:
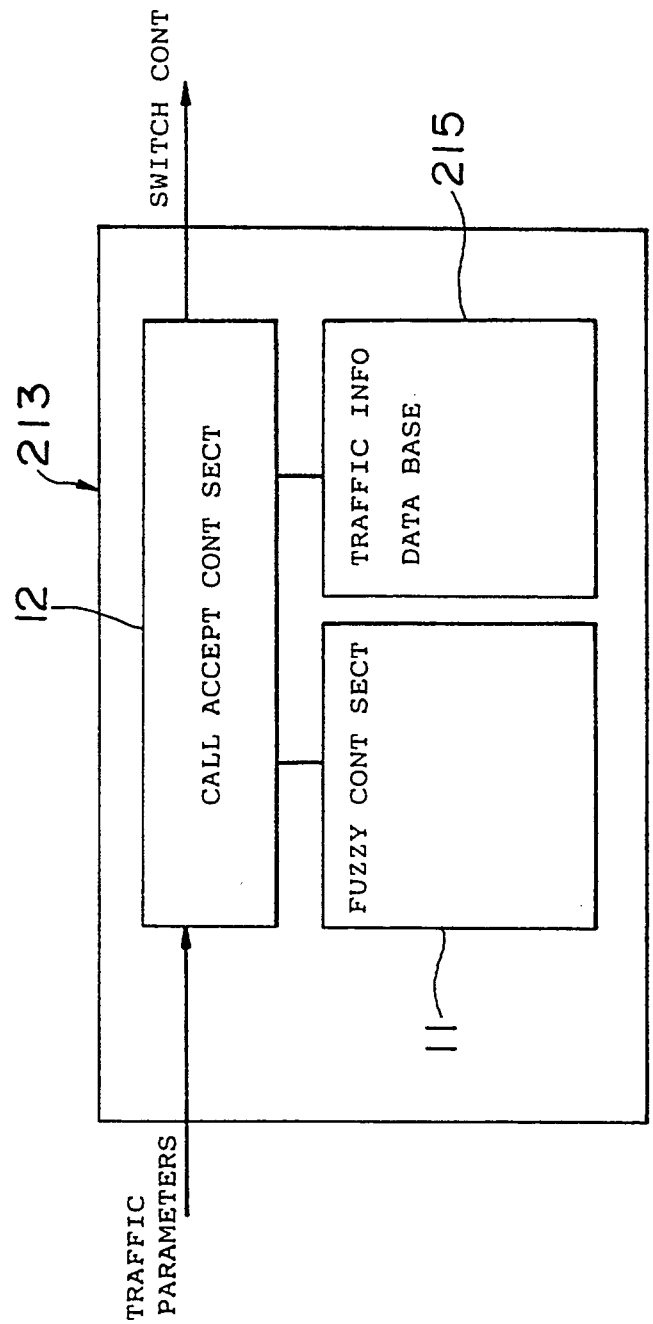
FIG. 8 is a block diagram showing the configuration of a connection admission system.

FIG. 8 shows the configuration of the call processing system 213, which is composed of a connection admission control section 12 (connection admission control unit), a fuzzy control section 11 (fuzzy control unit), and a traffic information data base 215. The traffic parameters of a call are first transmitted to the connection admission control section 12, and further to the fuzzy control section 12 on the basis of the control of the connection admission control section 12. The fuzzy control section 11 estimates the band of the call on the basis of the transmitted traffic parameters.

The call acceptance control section 12 executes the routing within the switch 212 and the band allocation on the basis of the band estimation value calculated by the-fuzzy control section 11. The band allocation information is recorded in the traffic information data base 215.

Figure 9:
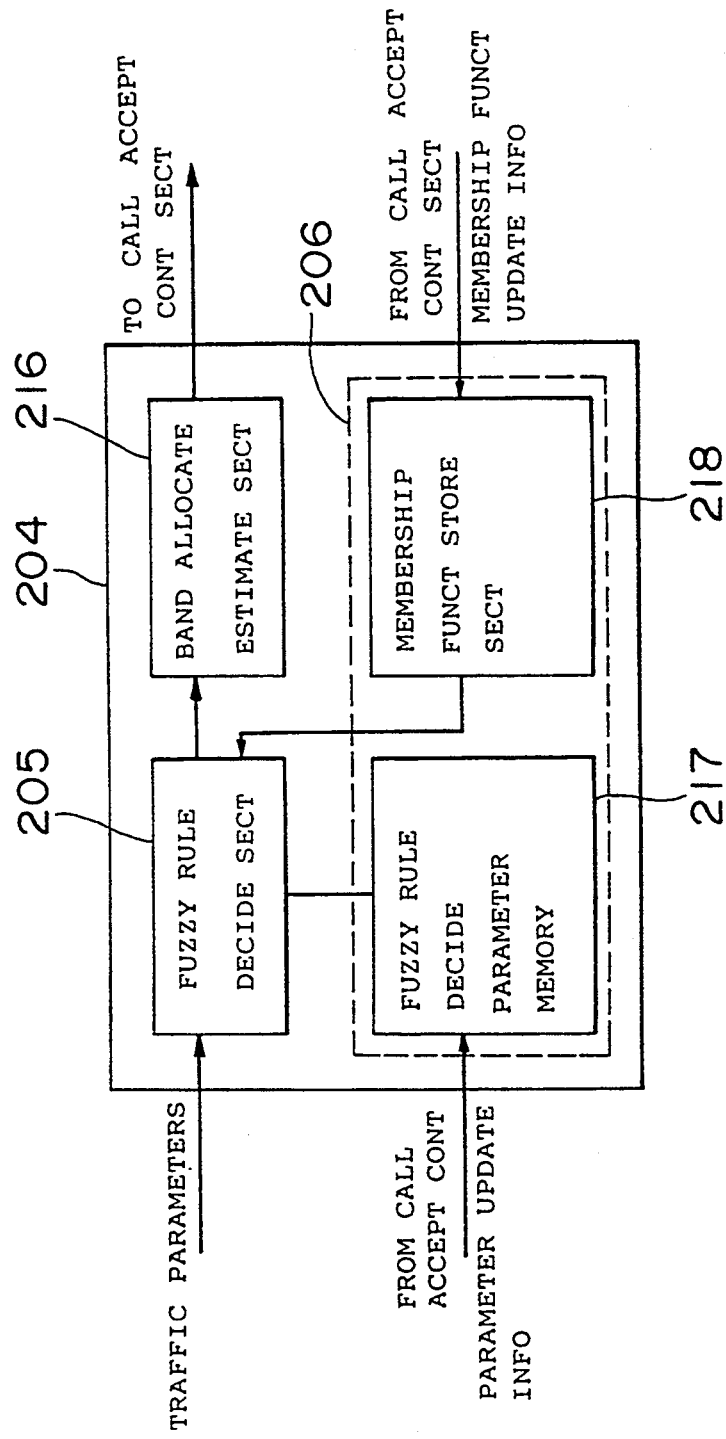
FIG. 9 is a block diagram showing the internal configuration of the fuzzy control section.

FIG. 9 shows the internal configuration of the fuzzy control section 11, which comprises a fuzzy rule deciding section 205, a band allocation value estimating section 216, and a memory section 206 (fuzzy rule storing unit). Further, the memory section 206 is composed of a fuzzy rule deciding parameter memory section 217 and a membership function storing section 218.

In the fuzzy rule deciding section 205, the fuzzy rule decision is executed on the basis of the traffic parameters transmitted from the connection admission control section 12 and in accordance with the fuzzy rule deciding parameters and membership functions. The respective output values obtained by the fuzzy rule deciding section 205 are transmitted to the band allocation value estimating section 216. This estimating section 216 obtains the weighted mean of the actually allocated band estimation value. The band allocation value obtained as described above is sent to the connection admission control section 12.

In response to the band allocation value, the connection admission control section 12 accepts the call when the estimation value is accommodated in the transmission line, but rejects the call when not accommodated.

The deciding procedure of the fuzzy rule deciding section 205 will be described in detail hereinbelow.

Here, the fuzzy rule deciding section 205 executes the fuzzy inference on the basis of if-then rules as follows (See FIG. 12):

[Formula 8]

R1: if x1 is small then y1 is big and $=a_{11}*x1+a_{12}$

R2: if x1 is big then y2 is small and 32 $a_{21}*x1+a_{22}$ where $a_{lm}$ ($1 \leq l \leq 2$, $1 \leq m \leq 2$) is a parameter decided empirically, and the respective parameters (l, m, Vp, and Va) are determined for brevity as listed in Table 1 below:

TABLE 1

|  | m | |
|---|---|---|
| 1 | 1 | 2 |
| 1 | Vp | 0, 0 |
| 2 | Va | 0, 0 |

Further, Va denotes the average speed value of the communication service, and Vp denotes the peak speed value of the communication service.

$$y = \left( \sum_{i=1}^{2} \omega i * yi \right) / \sum_{i=1}^{2} \omega i \quad \text{[Formula 9]}$$

where $\omega i$ denotes the adaptability of the antecedent of the i-th rule, which can be obtained as follows:

$$\omega i = \prod_{K=1}^{2} A_{ik}(Xi) \quad \text{[Formula 10]}$$

where Aik (Xi) denotes the grade of Xi of the fuzzy set $A_{ik}$.

Figure 11:
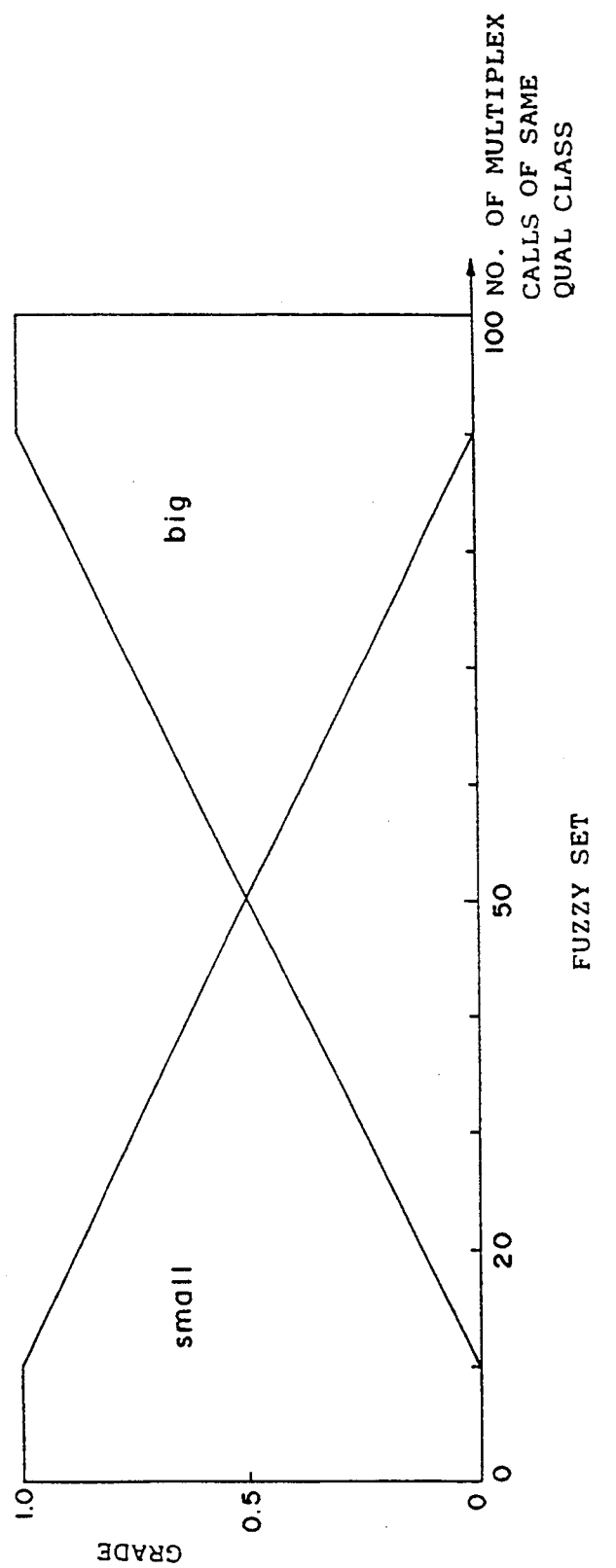
FIG. 11 is graphical representation showing membership functions used for the antecedent for the fuzzy inference of the embodiment 2.

FIG. 11 shows trapezoidal membership functions used for the antecedent for fuzzy inference.

On the basis of the above-mentioned formulae, the band estimation is executed on the basis of the fuzzy control rules and with the use of the linear membership functions for the consequent under the conditions that the information X1 necessary for the connection admission control denotes the number of multiplex calls of the same quality class, and y denotes the band allocation value.

Figure 10:
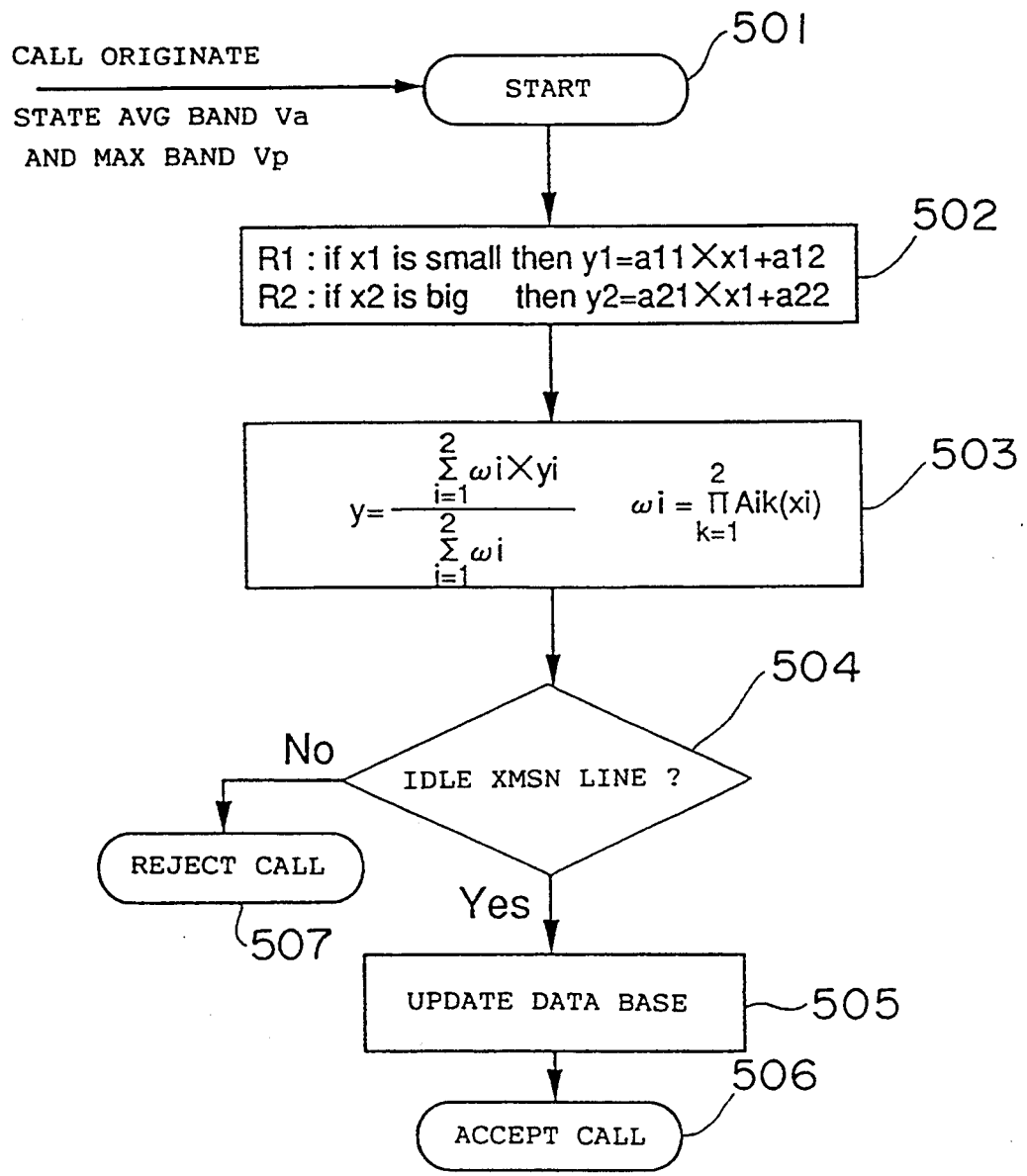
FIG. 10 is a flowchart showing the call acceptance processing procedure of the embodiment 2.

FIG. 10 is a flowchart showing the above-mentioned call accept processing procedure.

In FIG. 10, when the average band Va and the maximum band Vp are stated as the traffic parameters (in step 501), the band allocation value y is obtained on the basis of the formulae 8, 9 and 10 (in steps 502 and 503). Further, control discriminates whether there exists an idle transmission line corresponding to this band allocation value y (in step 504). If there exists the idle transmission line, the data base is updated (in step 505) and further the call is accepted (in step 506). In contrast with this, If there exists no idle transmission line, control rejects the call (in step 507).

A practical example of calculating the band allocation value will be described hereinbelow.

First, the assumption is made that a call connection request is transmitted from the B-ISDN terminal 1 to the ATM switching system 1, and the stated parameters are as follows:

Peak speed value: Vp=1 Mb/s

Average speed value: Va=0.5 Mb/s

Number of multiplex calls of the same quality class (the number of the calls of the same quality class in current communications is 19): xi=20

Under these conditions, on the basis of the formula 8:

$y1=a_{11}*x1+a_{12}=Vp*20=1.0M*20=20M$ $y2=a_{21}*x1+a_{22}=Vm*20=0.5M*20=10M$

On the basis of the formula 9:

$\omega1=$small (20)$=0.875$ $\omega2=$big (20)$=0.125$

On the basis of the formula (10), $y = (\omega1 * y1 + \omega2 * y2)/(\omega1 + \omega2)$
$= (0.875 * 20 M + 0.125 * 10 M)/(0.875 * 0.125)$
$= 18.75 M$ (b/s)

As described above, the number of communications of the same quality class is 19 and the total value of the band allocation values required including a new call is 18.75 Mb/s. Control discriminates whether this updated value is accommodated in the transmission line band for the current communications. If accommodated, control accepts the call. When accepted, the control updates the total of the band allocation values of the same quality class of the accepted calls to 18.75 Mb/s.

EMBODIMENT 3

(Discrete membership functions are adopted)

The hardware configuration of this embodiment 3 is the same as that shown in FIGS. 7 to 9, so that any detailed description thereof is omitted herein.

Figure 17:
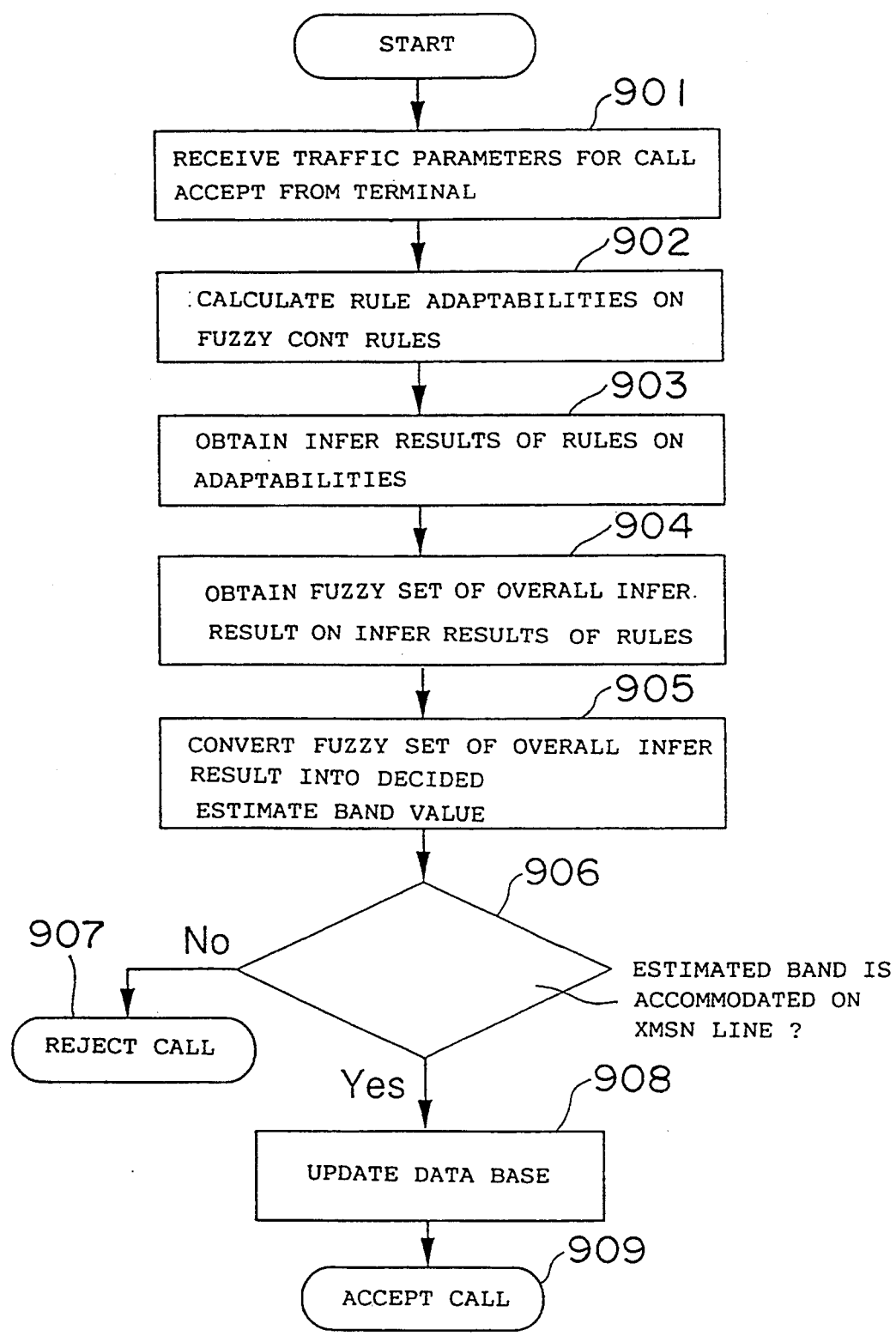
FIG. 17 is a flowchart for assistance in explaining the processing procedure of the embodiment 3.

The processing procedure will be described with reference to the processing flowchart shown in FIG. 17.

Figure 13:
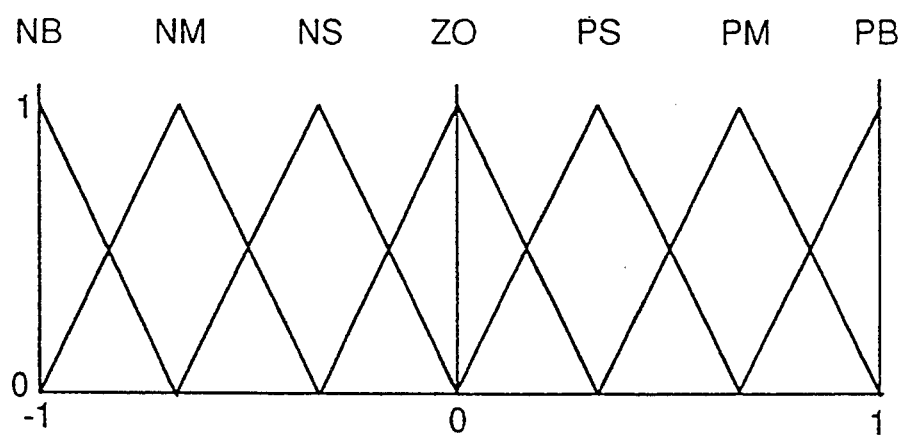
FIG. 13 is a graphical representation for assistance in explaining discrete membership functions for the fuzzy inference of the embodiment 3.

When the discrete membership functions are used, the membership functions as shown in FIG. 13 can be expressed by the following formula:

$$M(x) = (-|x-b| + a)/a \ VO, \ a > 0$$

Further, In FIG. 13, each set of the fuzzy sets is standardized within a section $[-1, -1]$; the ordinate indicates the numerical value of grade from 1 to 0; and the maximum grade is 1 and the minimum grade is 0.

A practical example of the ease where the discrete membership functions are used will be described with reference to FIG. 17.

Control receives the peak speed and the average speed of the communication service now requested, which are stated as the traffic parameters from the user (B-ISDN terminal 1) to the ATM switching system 2 (in step 901). Here, the fuzzy control rules are as follows:

R1: if x is NB then y is near-average

R2: if x is ZO then y is medium

R2: if x is PB then y is near-peak where x denotes the numerical value indicative of the degree of the number m of multiplex calls of the same quality (here, $x = 1/m$).

Figure 14:
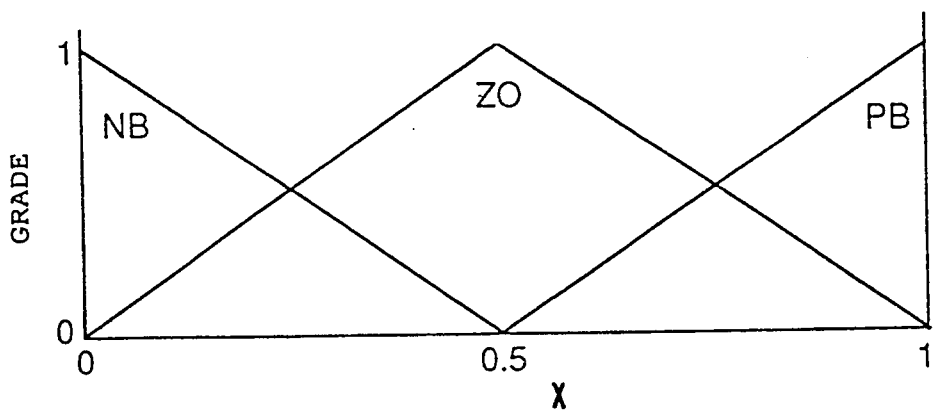
FIG. 14 is a graphical representation for assistance in explaining discrete membership functions used for the antecedent of the embodiment 3.

Here, the membership functions (NB, ZO, PB) of discrete type as shown In FIG. 14 are used as the fuzzy variables of the antecedents. In FIG. 14, the value of x is taken on the abscissa.

Figure 15:
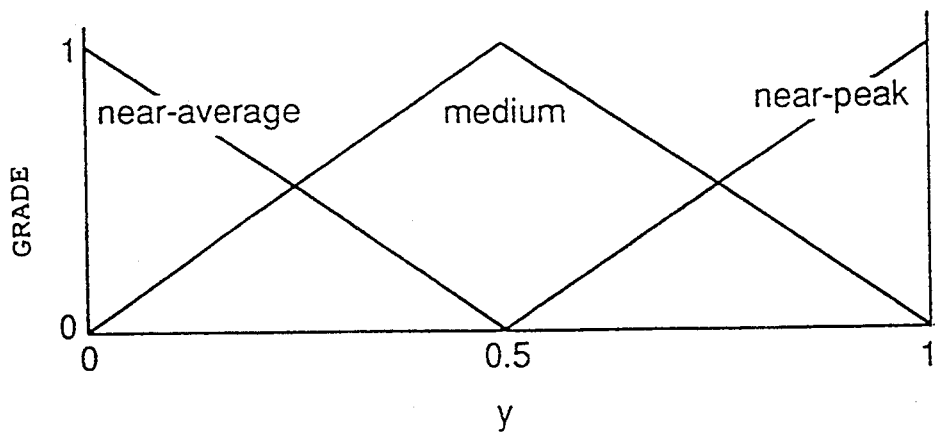
FIG. 15 is a graphical representation for assistance in explaining discrete membership functions used for the consequent of the embodiment 3.

On the other hand, the membership functions (near-average, medium, near-peak) of discrete type as shown in FIG. 15 are used as the fuzzy variables of the consequent. In FIG. 15, the value y of [1,2] is taken on the abscissa.

In the case where the peak speed $Vp = 1M$ (b/s); the average speed $Va = 0.5M$ (b/s); the multiplex call number $m = 20$; and the call number of the same quality is 19, $x = 1/20 = 0.05$.

Then, the adaptability $\omega 1$, $\omega 2$ and $\omega 3$ of the antecedents of the respective rules R1, R2 and R3 are obtained (in step 902) as follows:

$$\omega 1 = NB \ (0.05) = 0.95$$

$$\omega 2 = ZO \ (0.05) = 0.05$$

$$\omega 3 = PB \ (0.05) = 0$$

Further, the respective inferred results y1, y2 and y3 of the rules R1, R2 and R3 are obtained (in step 903) as follows:

$$y1 = \omega 1 * \text{near-average}$$

$$y2 = \omega 2 * \text{medium}$$

$$y3 = \omega 3 * \text{near-peak}$$

The fuzzy set $B^o(y)$ of the overall inferred result by the three rules can be obtained as the weighted mean of the adaptability as follows:

$$B^o = y1 \ U \ y2 \ U \ y3$$

Figures 16A, 16B:
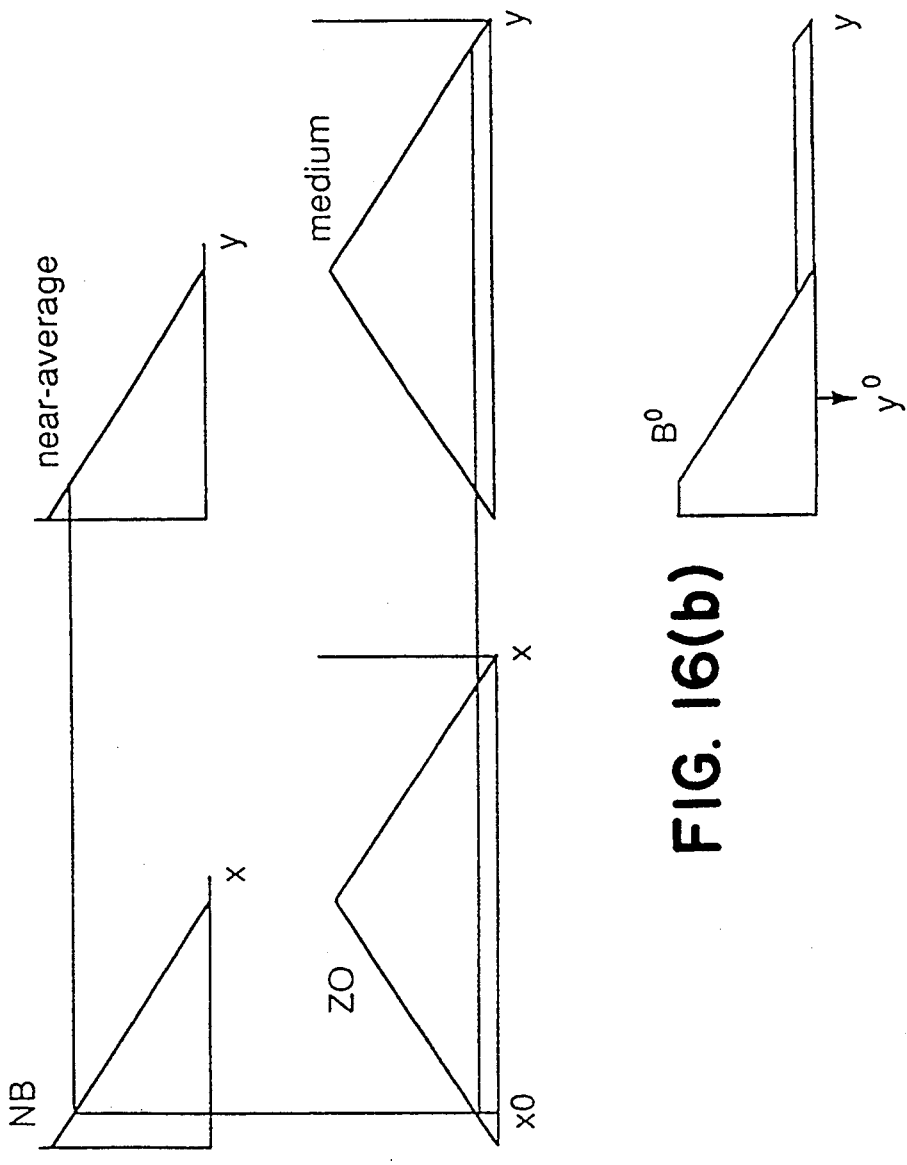
FIGS. 16(a) and 16(b) are illustrations for assistance in explaining the if-then rule used for the present invention.

Finally, the overall inferred result y0 can be obtained as the center of gravity of the membership function B0 (in step 904) as shown in FIG. 16 as follows:

$$y0 = (\int B^o(y) \ y \ dy) / (\int B^o(y) \ dy) = 1.24$$

Therefore, it is possible to calculate the decided estimated band value V (in step 905) as follows:

$$V = 1.24 * Va = 1.24 * 0.5 = 0.62M \ (b/s)$$

Accordingly, when the total value of the call allocation values of the same quality class of $Vp = 1M$ (b/s), $Va = 0.5M$ (b/s) is changed to $0.62 * 20 = 12.4M$ (b/s), as far as this value is accommodated in the transmission line band of the current communications, the call is accepted (in step 906). However, if not accommodated (lack of idle band), the call is rejected and this rejection is indicated to the B-ISDN terminal 1 (in step 907).

In the case where the call is accepted in step 906, the traffic data base 215 is updated to the total value (12.4M (b/s)) of the band allocation values of the same quality class of the accepted call (in step 908), and the call is now accepted (in step 909).

EMBODIMENT 4

(Continuous membership functions are adopted)

The continuous membership functions can be expressed generally as follows:

$$M(x) = \exp(-(x-b)^{-2}/a^2)(a, b: \text{constant})$$

Figure 18:
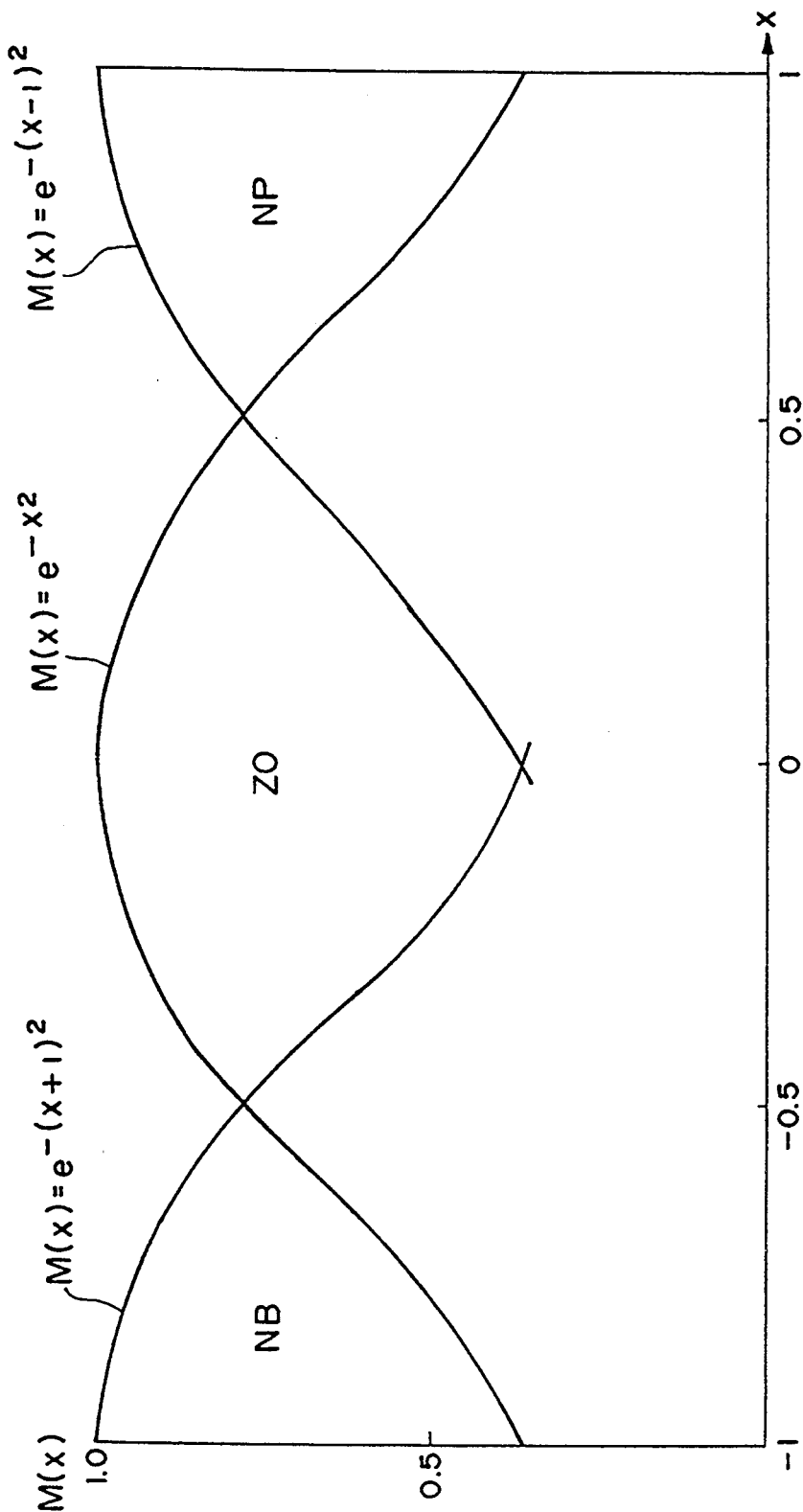
FIG. 18 is a graphical representation showing continuous membership functions used for the antecedent of the embodiment 4.

FIG. 18 shows these membership functions, in which the fuzzy set is standardized within the section $[-1, 1]$. The ordinate indicates the numerical value referred to as grade and the maximum value is 1 and the minimum value is 0.

In the same way as the discrete membership functions, the fuzzy rules can be expressed as follows:

R1: if x is NB then y is near-average

R2: if x is ZO then y is medium

R2: if x is PB then y is near-peak

The continuous membership functions as shown In FIG. 18 are used as the membership functions (NB, ZO, PB) of the fuzzy variables of the antecedent. In the general continuous membership function as $$M(x) = \exp(-(x-b)^{-2}/a^2)$$

The values (a, b) are determined as $NB = (a, b) = (1, -1)$, $ZO = (a, b) = (1, 1)$, $NB = (a, b) = (1, 1)$. Further, in FIG. 18, the abscissa is x.

Figure 19:
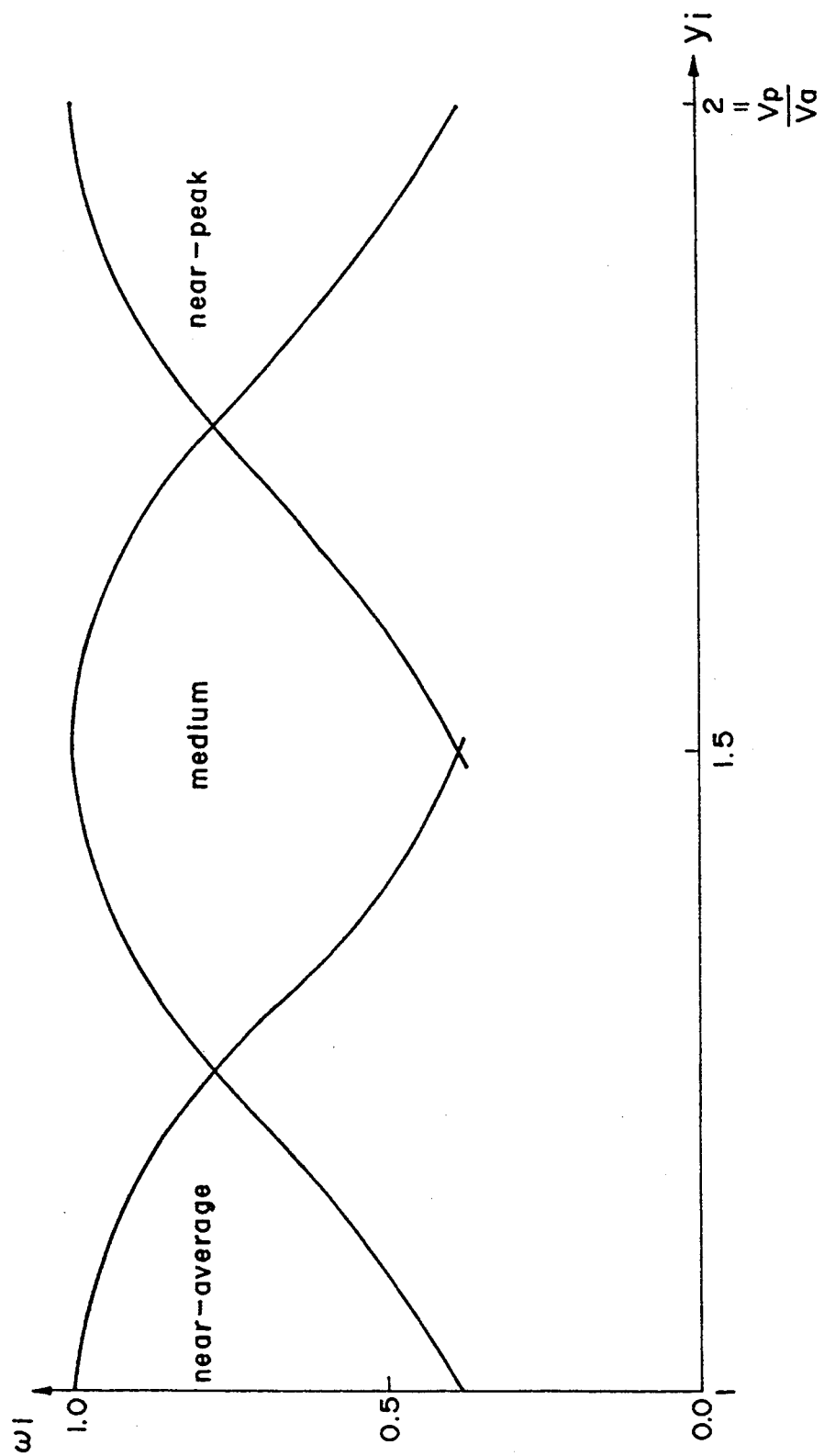
FIG. 19 is a graphical representation showing continuous membership functions used for the consequent of the embodiment 4.
Figure 20:
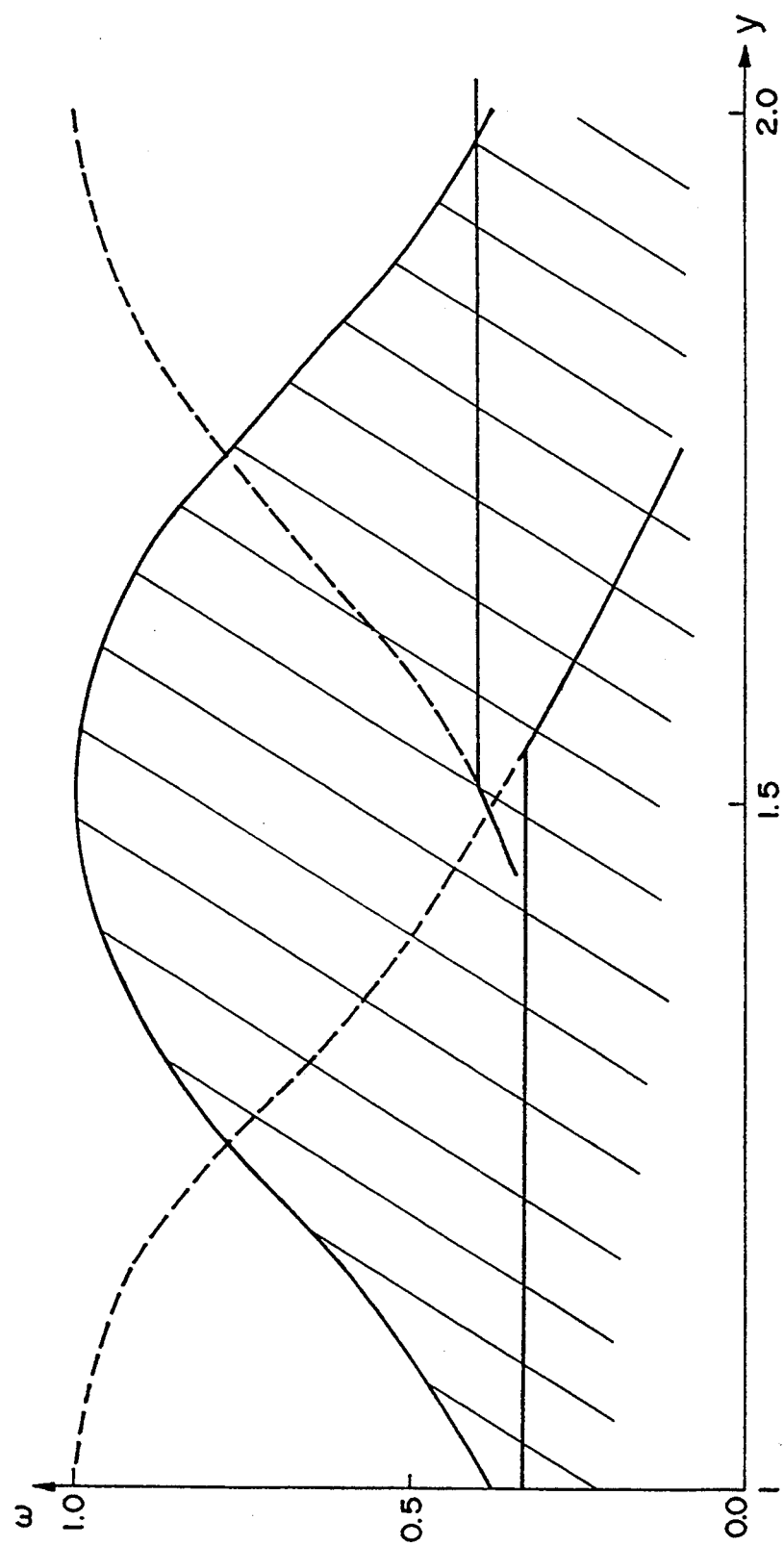
FIG. 20 is a graphical representation showing the fuzzy set of the overall inferred result obtained as the weighted mean of adaptabilities of when the continuous membership functions of the embodiment 4 are used.

FIG. 19 shows the membership functions (near-average, medium, near-peak) for the fuzzy variable used for the consequent, in which the adaptability $\omega i$ is taken on the ordinate and the inferred result yi is taken on the ordinate.

In the case where the peak speed Vp=1M (b/s); the average speed Va=0.5M (b/s); the multiplex call number m=20; and the call number of the same quality is 19, x=1/20=0.05.

Then, the adaptability $\omega 1$, $\omega 2$ and $\omega 3$ of the antecedents of the respective rules R1, R2 and R3 are obtained as follows:

$$\omega 1 = NB\ (0.05) = 0.332$$

$$\omega 2 = ZO\ (0.05) = 0.998$$

$$\omega 3 = PB\ (0.05) = 0.406$$

Further, the respective inferred results y1, y2 and y3 of the rules R1, R2 and R3 are obtained as follows:

$$y1 = \omega 1 * near\text{-}average$$

$$y2 = \omega 2 * medium$$

$$y3 = \omega 3 * near\text{-}peak$$

The adaptability of the fuzzy set $B^o(y)$ of the overall inferred result in accordance with the three rules can be obtained as the weighted mean as follows:

$$B^o = y1\ U\ y2\ U\ y3$$

Finally, the overall inferred result y0 can be obtained as the center of gravity of the membership function B0 as follows:

$$y0 = (\int B0(y)\ y\ dy)/(\int B0(y)\ dy) = 1.5$$

Therefore, it is possible to calculate the decided estimated band value V (in step 905) as follows:

$$V = 1.5 * Va = 1.5 * 0.5 = 0.75M\ (b/s)$$

Accordingly, when the total value of the call allocation values of the same quality class of Vp=1M (b/s), Va=0.5M (b/s) is changed to 0.75*20=15.0M (b/s), as far as this value is accommodated in the transmission line band of the current communications, the call is accepted.

In the case where the call is accepted, the traffic data base 215 is updated to the total value (15.0M (b/s)) of the band allocation values of the same quality class of the accepted call.

EMBODIMENT 5

Figure 21:
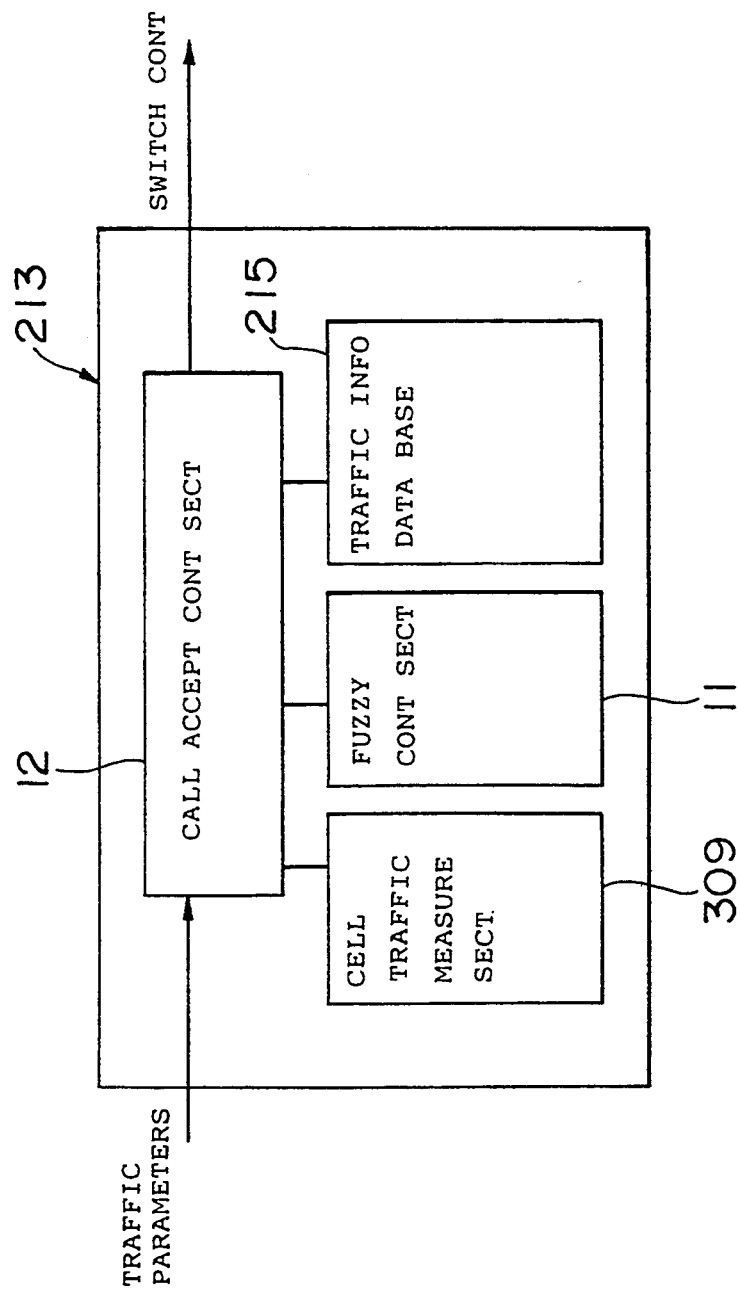
FIG. 21 is a block diagram showing the configuration of the embodiment 5 of the call acceptance processing system.

FIG. 21 shows the configuration of the call processing system 213, which is composed of a connection admission control section 12, a fuzzy control section 11, and a traffic information data base 215, and a cell traffic measuring section 309. The traffic parameters of a call are transmitted to the fuzzy control section 11 under control of the connection admission control section 12. The fuzzy control section 11 estimates the band of the call on the basis of the transmitted traffic parameters.

The cell traffic measuring section 309 observes the cell traffic transmitted form the B-ISDN terminal 1. This traffic measuring section 308 is provided with the function of estimating the traffic parameters such as the maximum and average speed, etc. on the basis of the cell incoming condition. Further, the configuration of the fuzzy control section 11 is the same as that of the embodiment 3 shown in FIG. 9, so that the detailed description thereof is omitted herein.

Figure 22:
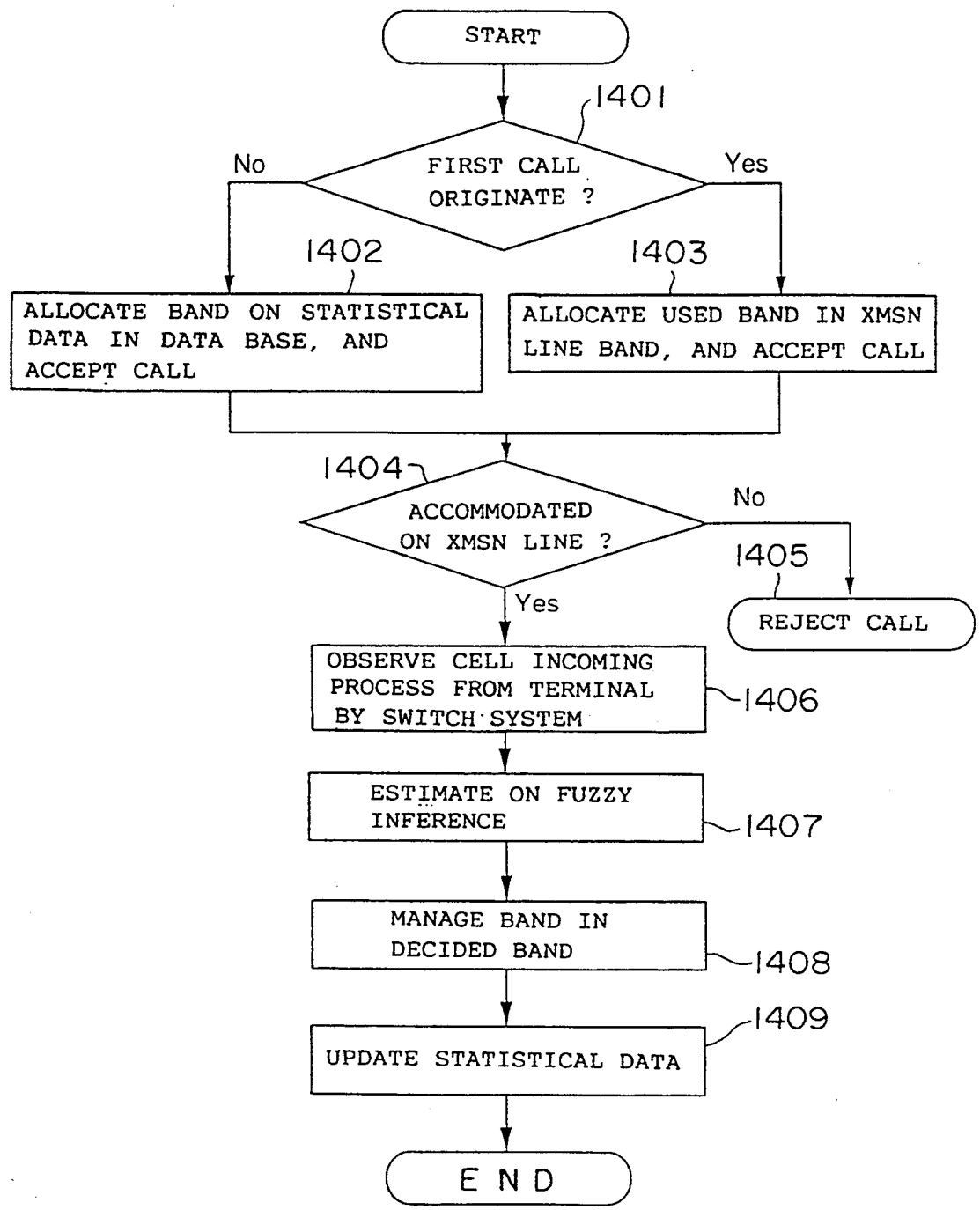
FIG. 22 is a flowchart for assistance in explaining the processing procedure of the embodiment 5.

The processing procedure of the embodiment 5 will be described hereinbelow with reference to FIG. 22. In response to a call request from the B-ISDN terminal 1, the call processing system 213 first discriminates whether this call is first call or not (in step 1401). The call histories (records) of the respective B-ISDN terminals 1 are registered in the traffic information data base 215. Therefore, control can discriminate whether the current call is the first call.

Here, if not the first call; that is, in the case where the B-ISDN terminal 1 whose call was established before, control allocates the band in the same way as before with the use of the statistical data so far reserved in the traffic information data base 215 (in step 1402). Further, if the first call, control allocates the maximum band to the call (in step 1403).

Thereafter, control discriminates whether the band decided in the steps 1402 and 1403 can be accommodated In the practical transmission line (in step 1404). If not accommodated, control informs the B-ISDN terminal 1 of the call rejection (in step 1405).

Successively, the cell traffic measuring section 309 in the call processing system 213 continuously measures the incoming conditions of the cell transmitted from the B-ISDN terminal 1 (in step 1406). Here, the incoming conditions are the average cell incoming interval, the maximum cell incoming interval, the multiplex status of the cells of the same quality, etc.

Successively, control executes a band estimation in accordance with the fuzzy inference on the basis of the measured results (used as a set) (in step 1407). The method of inferring the band will be described later in detail.

Further control executes band management on the basis of the inferred band (in step 1408), and updates the statistical data of the traffic information data base 215 on the basis of the determined band. Here, the updated data is used as the statistical data when the succeeding call is requested from the same terminal 1 (see step 1402).

The fuzzy inference method of the embodiment 5 will be described hereinbelow.

Figure 23:
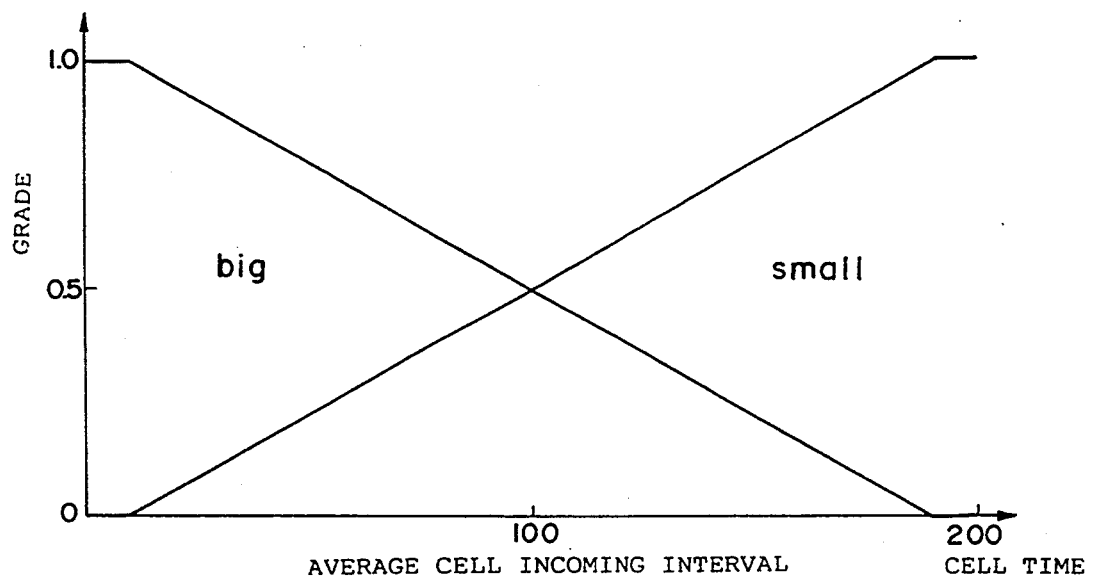
FIG. 23 is a graphical representation showing membership functions representative of the fuzzy set of the average cell incoming intervals in the embodiment 5.
Figure 24:
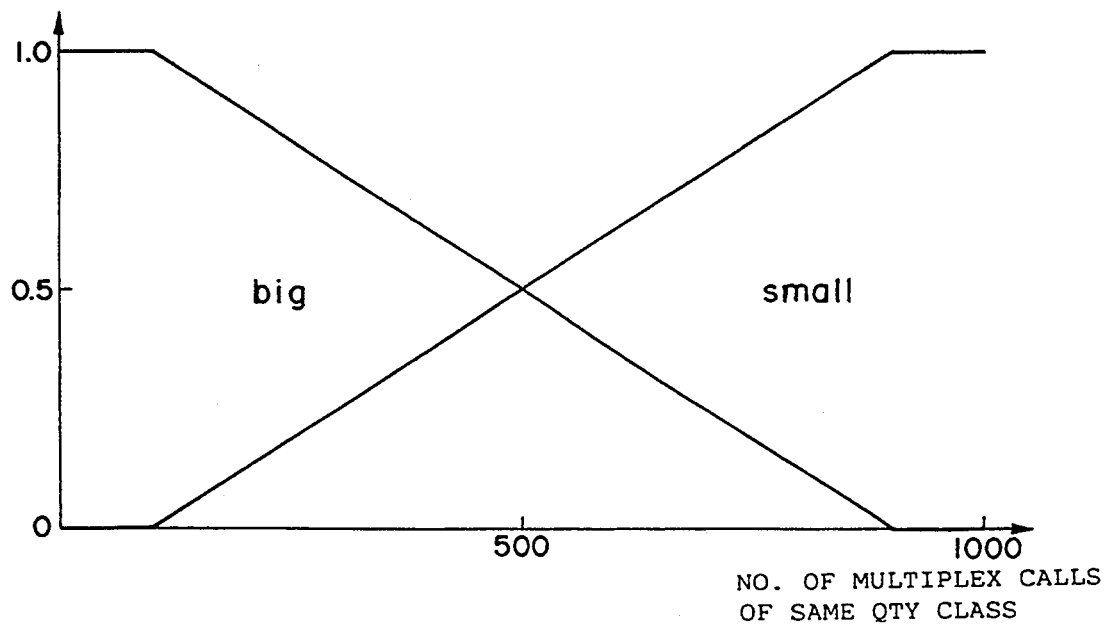
FIG. 24 is a graphical representation showing membership functions representative of the fuzzy set of the maximum cell incoming intervals in the embodiment 5.
Figure 25:
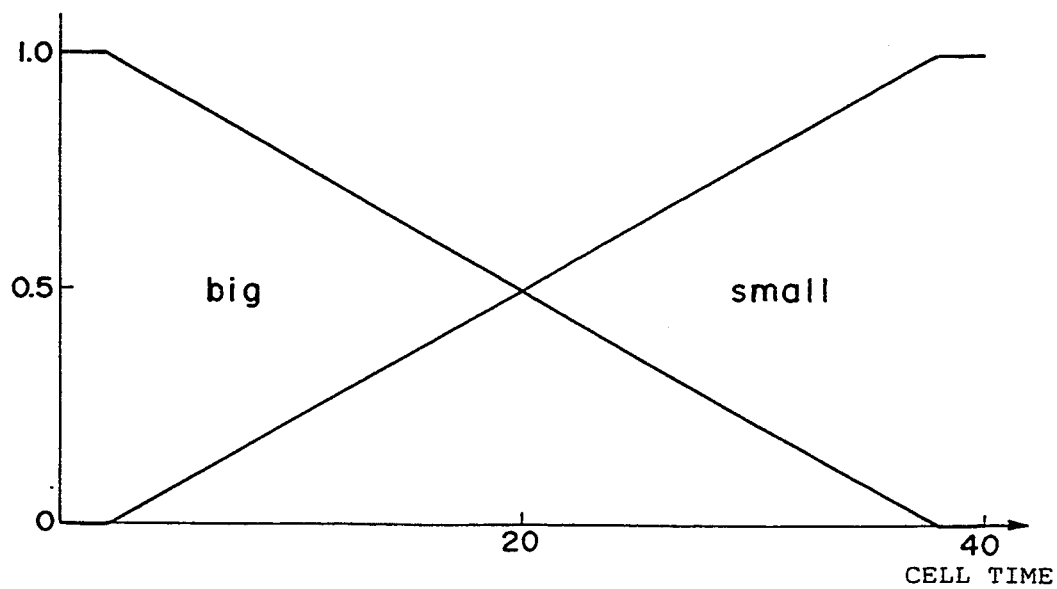
FIG. 25 is a graphical representation showing membership functions representative of the fuzzy set of the number of multiplex calls of the same quality classes in the embodiment 5.

Here, the membership functions as shown in FIGS. 23, 24 and 25 are used. The membership function shown in FIG. 23 is used to represent the fuzzy set M1 of the average cell incoming interval; that shown in FIG. 24 is used to represent the fuzzy set M2 of the maximum cell incoming interval; and that shown in FIG. 25 is used to represent the fuzzy set M3 of the multiplex call number of the same class.

The fuzzy control rules can be expressed as follow: wherein xi denotes the interval of the average cell incoming time observed during a constant time; x2 denotes the interval of the maximum cell incoming time observed during a constant time; and x3 denotes the multiplex call number of the same class.

R1: if x1 is small and x2 is small and x3 is small then $$y1 = a_{1.1} * x1 + a_{1.2} * x2 + a_{1.3} * x3 + a_{1.4}$$

R2: if x1 is small and x2 is small and x3 is big then $$y2 = a_{2.1} * x1 + a_{2.2} * x2 + a_{2.3} * x3 + a_{2.4}$$

R3: if x1 is small and x2 is big and x3 is small then $$y3 = a_{3,1}*x1 + a_{3,2}*x2 + a_{3,3}*x3 + a_{3,4}$$

R4: if x1 is small and x2 is big and x3 is big then $$y4 = a_{4,1}*x1 + a_{4,2}*x2 + a_{4,3}*x3 + a_{4,4}$$

R5: if x1 is big and x2 is small and x3 is small then $$y5 = a_{5,1}*x1 + a_{5,2}*x2 + a_{5,3}*x3 + a_{5,4}$$

R6: if x1 is big and x2 is small and x3 is big then $$y6 = a_{6,1}*x1 + a_{6,2}*x2 + a_{6,3}*x3 + a_{6,4}$$

R7: if x1 is big and x2 is big and x3 is small then $$y7 = a_{7,1}*x1 + a_{7,2}*x2 + a_{7,3}*x3 + a_{7,4}$$

R8: if x1 is big and x2 is big and x3 is big then $$y8 = a_{8,1}*x1 + a_{8,2}*x2 + a_{8,3}*x3 + a_{8,4}$$

where $a_{j,k}$ ($1 \leq j \leq 8$, $1 \leq k \leq 4$) are parameters decided empirically, and therefore determined as listed in Table 2 for brevity as follows:

TABLE 2

| j | k=1 | k=2 | k=3 | k=4 |
|---|-----|-----|-----|-----|
| 1 | $P_{1a}$ | $P_{2a}$ | $P_{3a}$ | $P_{4a}$ |
| 2 | $P_{1a}$ | $P_{2a}$ | $P_{3a}$ | $P_{4a}$ |
| 3 | $P_{1a}$ | $P_{2a}$ | $P_{3a}$ | $P_{4a}$ |
| 4 | $P_{1a}$ | $P_{2a}$ | $P_{3a}$ | $P_{4a}$ |
| 5 | $P_{1a}$ | $P_{2a}$ | $P_{3a}$ | $P_{4a}$ |
| 6 | $P_{1a}$ | $P_{2a}$ | $P_{3a}$ | $P_{4a}$ |
| 7 | $P_{1a}$ | $P_{2a}$ | $P_{3a}$ | $P_{4a}$ |
| 8 | $P_{1a}$ | $P_{2a}$ | $P_{3a}$ | $P_{4a}$ | where $$P_{1a} = C/(x1^2 * \delta * 3)$$

$$P_{1p} = C/(x1*x2*\delta*3)$$

$$P_{2a} = C/(x1*x2*\delta*3)$$

$$P_{2a} = C/(x2^2*\delta*3)$$

$$P_{3a} = C/(x1*x3*\delta*3)$$

$$P_{3a} = C/(x2*x3*\delta*3)$$

$$P_{4a} = 0$$

$$P_{4p} = 0$$

further, where C denotes the cell length (53*8 bit),

A practical example is explained as follows:

Now, If the cell time=2.7263 μsec (=53*8/155.52 Mb/b); the observed average cell incoming interval x1=311; the observed maximum incoming interval x2=156; and the number of calls of the same quality class during communications=20, $$
\begin{aligned}
y1 &= a_{1,1}*x1 + a_{1,2}*x2 + a_{1,3}*x3 + a_{1,4}*x4 + a_{1,5} \\
&= C/(x1^2 * \delta * 3) * x1 + C/(x1*x2*\delta*3) x2 + \\
&\quad C/(x1*x3*\delta*3)*x3 + 0 \\
&= C/(x1*\delta*3) + C/(x1*\delta*3) + C/(x1*\delta*3) + 0 \\
&= C/(x1*\delta) \\
&= 0.5
\end{aligned}
$$

In the same way as above, y2, ... y8 can be obtained as y2=0.67, y3=0.67, y4=0.38, y5=0.67, y6=0.83, y7=0.83, and y8=1.0

Next, the adaptabilities w of the respective rules are calculated as follows:

$$
\begin{aligned}
\omega 1 &= M1(x1) * M2(x2) * M3(x3) \\
&= \text{small}(311) * \text{small}(156) * \text{small}(20) \\
&= 1.0 * 1.0 * 1.0 \\
&= 1.0
\end{aligned}
$$

$$
\begin{aligned}
\omega 2 &= M1(x1) * M2(x2) * M3(x3) \\
&= \text{small}(311) * \text{small}(156) * \text{big}(20) \\
&= 1.0 * 1.0 * 1.0 \\
&= 1.0
\end{aligned}
$$

In the same way, $\omega 3=0$, $\omega 4=0$, $\omega 5=0$, $\omega 6=0$, $\omega 7=0$, $\omega 8=0$, Therefore, the estimated band y is $$
\begin{aligned}
y &= \left( \sum_{i=1}^{8} \omega i * Yi \right) / \sum_{i=1}^{8} \omega i \\
&= 1.0 * 0.67/1.0 - 0.67 \text{ Mb/s}
\end{aligned}
$$

Accordingly, the band management is executed by use of this band value (0.67 Mb/s) hereinafter. In other words, the statistical data of the traffic information data base 215 is updated to this value, and further when a call is received from this B-ISDN terminal 1, the band is allocated by use of this statistical data (see step 1402).

EMBODIMENT 6

The hardware configuration is the same as that shown in FIGS. 7 to 9, so that any detailed description thereof is omitted herein.

Now, as the information necessary for call acceptance, four inputs x1 to x4 are defined by the following expressions:

[Formula 11]

$$X1 = V8/Vp$$

$$X2 = V8/Vt \text{ (transmission speed)}$$

$$x3 = SCV \text{ (square fluctuation coefficient)}$$

$$x4 = 1/\text{(call number of the same quality in communication)}$$

In this embodiment 6, 16 fuzzy rules R1 to R16 are constructed on the basis of the four inputs x1 to x4 in order to estimate an estimation value y of the band allocation as follows:

[Formula 12]

R1: if x1 is small 1 and x2 is small 2 and x3 is small 3 and x4 is small 4 then $$y1 = a_{1,1}*x1 + a_{1,2}*x2 + a_{1,3}*x3 + a_{1,4}*x4 + a_{1,5}$$

R2: if x1 is small 1 and x2 is small 2 and x3 is small 3 and x4 is big 4 then $$y2 = a_{2,1}*x1 + a_{2,2}*x2 + a_{2,3}*x3 + a_{2,4}x4 + a_{2,5}$$

R3: if x1 is small 1 and x2 is small 2 and x3 is big 3 and x4 is small 4 then $$y3 = a_{3,1}*x1 + a_{3,2}*x2 + a_{3,3}*x3 + a_{3,4}*x4 + a_{3,5}$$

R4: if x1 is small 1 and x2 is small 2 and x3 is big 3 and x4 is big 4 then $$y4 = a_{4,1}*x1 + a_{4,2}*x2 + a_{4,3}*x3 + a_{4,4}*x4 + a_{4,5}$$

R5: if x1 is small 1 and x2 is big 2 and x3 is small 3 and x4 is small 4 then $$y5 = a_{5,1}*x1 + a_{5,2}*x2 + a_{5,3}*x3 + a_{5,4}*x4 + a_{5,5}$$

R6: if x1 is small 1 and x2 is big 2 and x3 is small 3 and x4 is big 4 then $$y6 = a_{6,1}*x1 + a_{6,2}*x2 + a_{6,3}*x3 + a_{6,4}*x4 + a_{6,5}$$

R7: if x1 is small 1 and x2 is big 2 and x3 is big 3 and x4 is small 4 then $$y7 = a_{7,1}*x1 + a_{7,2}*x2 + a_{7,3}*x3 + a_{7,4}*x4 + a_{7,5}$$

R8: if x1 is small 1 and x2 is big 2 and x3 is big 3 and x4 is big 4 then $$y8 = a_{8,1}*x1 + a_{8,2}*x2 + a_{8,3}*x3 + a_{8,4}*x4 + a_{8,5}$$

R9: if x1 is big 1 and x2 is small 2 and x3 is small 3 and x4 is small 4 then $$y9 = a_{9,1}*x1 + a_{9,2}*x2 + a_{9,3}*x3 + a_{9,4}*x4 + a_{9,5}$$

R10: if x1 is big 1 and x2 is small 2 and x3 is small 3 and x4 is big 4 then $$y10 = a_{10,1}*x1 + a_{10,2}*x2 + a_{10,3}*x3 + a_{10,4}x4 + a_{10,5}$$

R11: if x1 is big 1 and x2 is small 2 and x3 is big 3 and x4 is small 4 then $$y11 = a_{11,1}*x1 + a_{11,2}*x2 + a_{11,3}*x3 + a_{11,4}*x4 + a_{11,5}$$

R12: if x1 is big 1 and x2 is small 2 and x3 is big 3 and x4 is big 4 then $$y12 = a_{12,1}*x1 + a_{12,2}*x2 + a_{12,3}*x3 + a_{12,4}*x4 + a_{12,5}$$

R13: if x1 is big 1 and x2 is big 2 and x3 is small 3 and x4 is small 4 then $$y13 = a_{13,1}*x1 + a_{13,2}*x2 + a_{13,3}*x3 + a_{13,4}*x4 + a_{13,5}$$

R14: if x1 is big 1 and x2 is big 2 and x3 is small 3 and x4 is big 4 then $$y14 = a_{14,1}*x1 + a_{14,2}*x2 + a_{14,3}*x3 + a_{14,4}*x4 + a_{14,5}$$

R15: if x1 is big 1 and x2 is big 2 and x3 is big 3 and x4 is small 4 then $$y15 = a_{15,1}*x1 + a_{15,2}*x2 + a_{15,3}*x3 + a_{15,4}*x4 + a_{15,5}$$

R16: if x1 is big 1 and x2 is big 2 and x3 is big 3 and x4 is big 4 then $$y16 = a_{16,1}*x1 + a_{16,2}*x2 + a_{16,3}*x3 + a_{16,4}*x4 + a_{16,5}$$

Here, "small 1" is a fuzzy variable (fuzzy set) representing that the input value x1 is small by definition, and "big 1" is a fuzzy variable representing that the input value x1 is large by definition.

Figure 26:
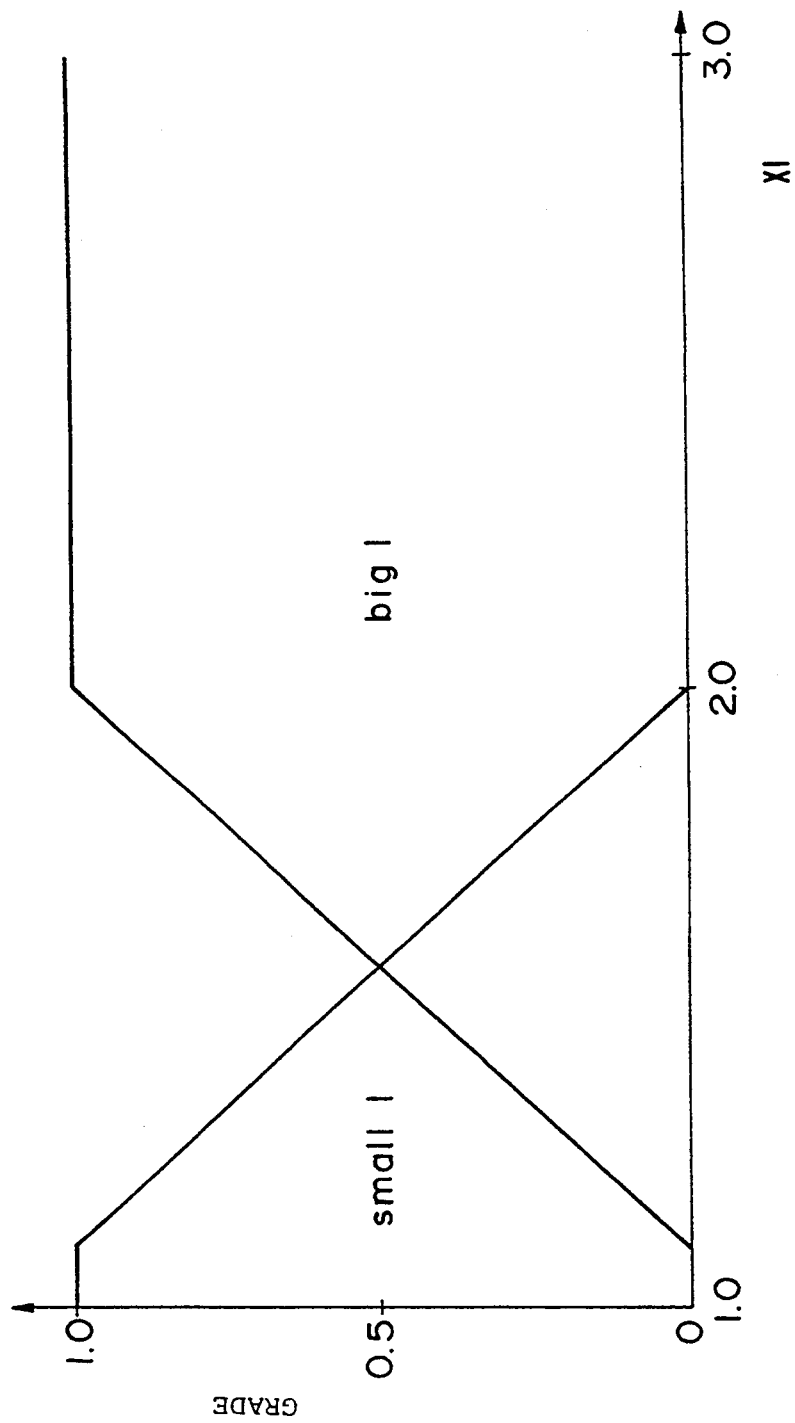
FIG. 26 is a first graphical representation for assistance in explaining the fuzzy rules of the embodiment 6.
Figure 27:
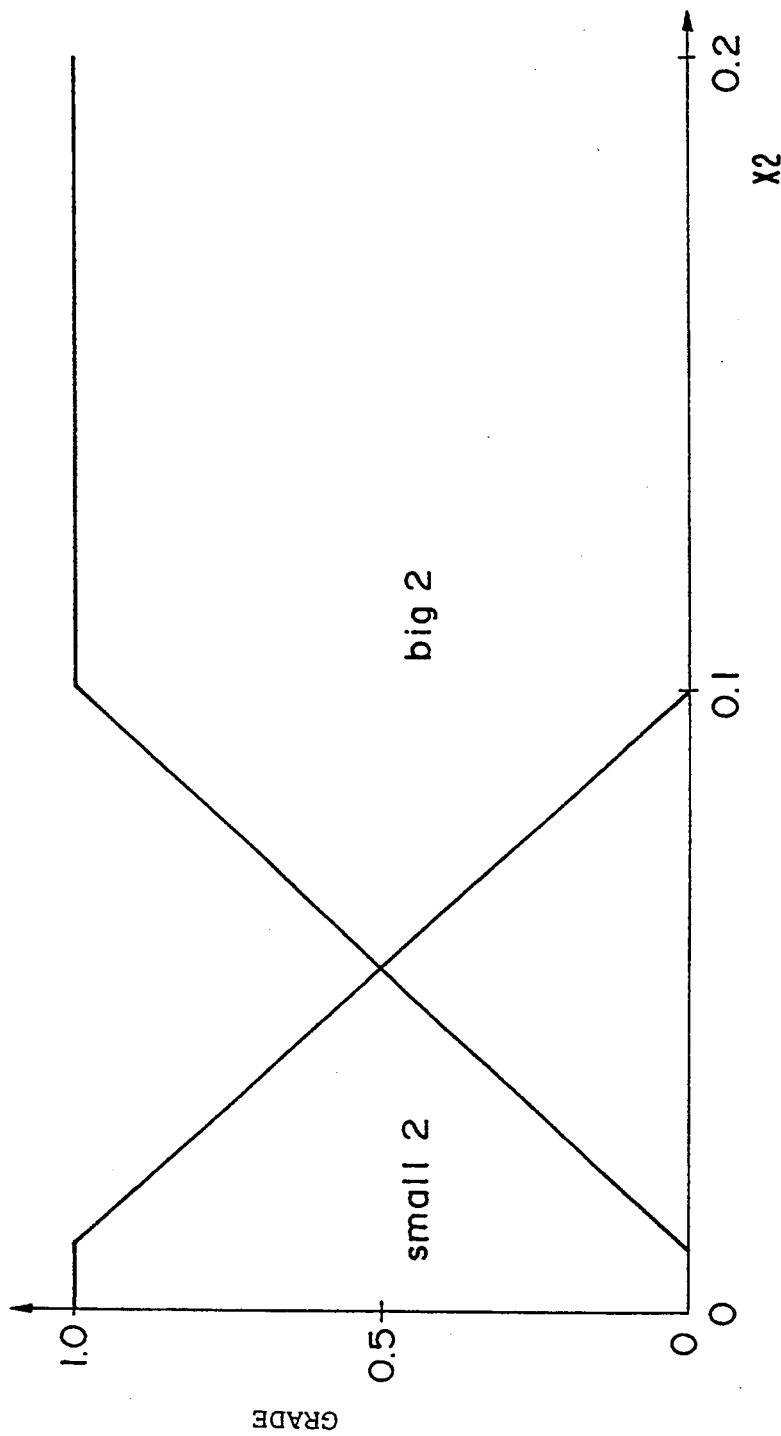
FIG. 27 is a second graphical representation for assistance in explaining the fuzzy rules of the embodiment 6.
Figure 28:
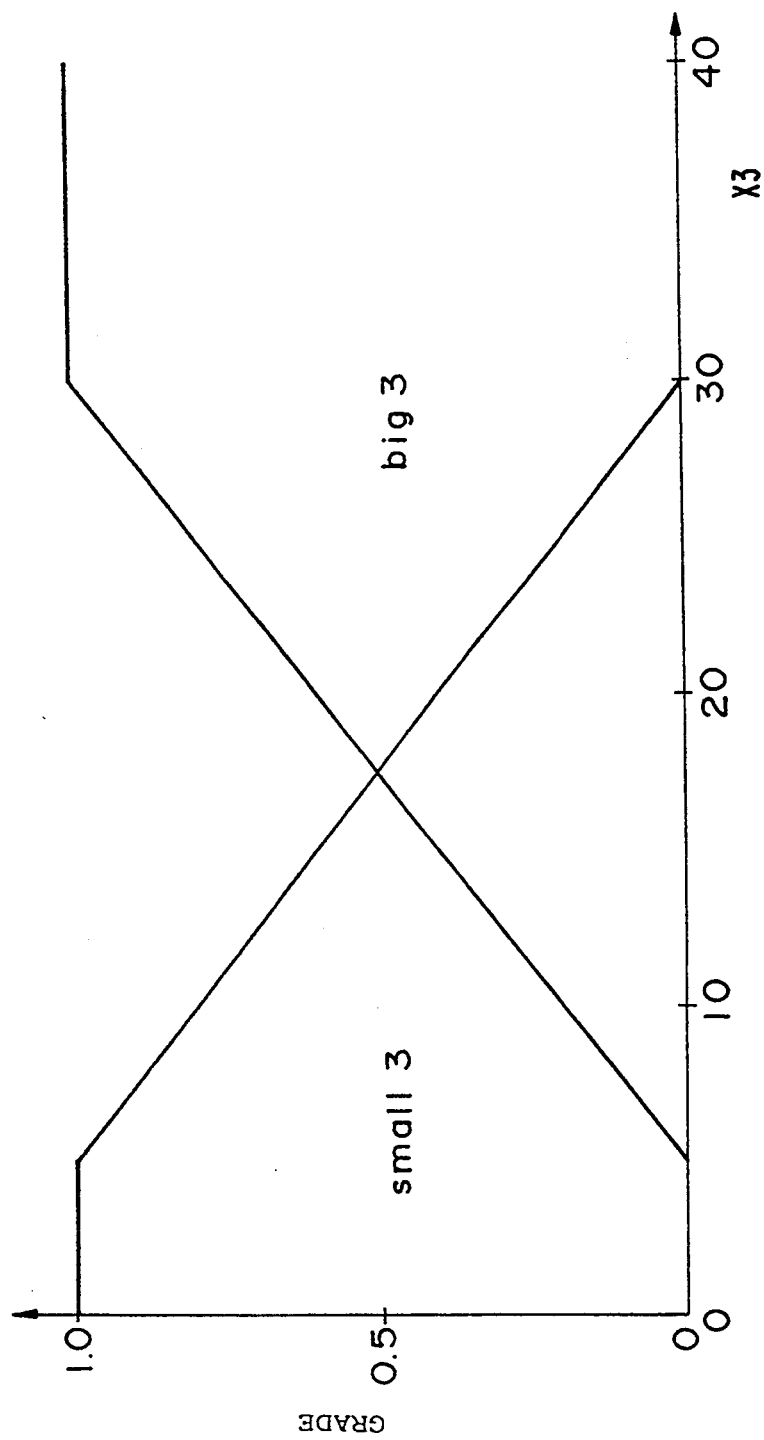
FIG. 28 is a third graphical representation for assistance in explaining the fuzzy rules of the embodiment 6.
Figure 29:
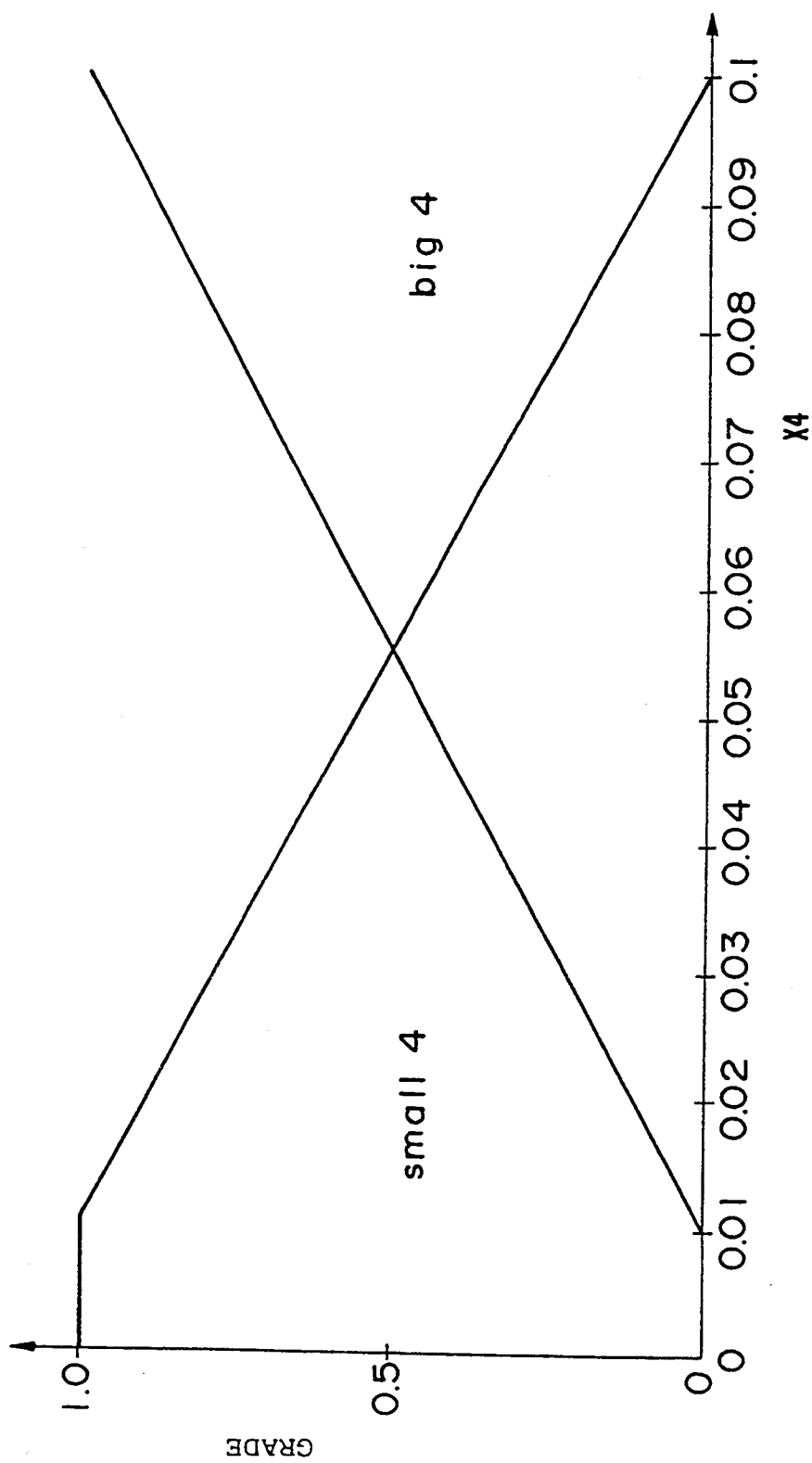
FIG. 29 is a fourth graphical representation for assistance in explaining the fuzzy rules of the embodiment 6.

In the same way as above, "small 2", "small 3" and "small 4" are fuzzy variables representing that the input values x2, x3 and x4 are small by definition, and "big 2", "big 3" and "big 4" are fuzzy variables representing that the input values x2, x3 and x4 are large by definition, Here, the membership functions as shown in FIG. 26 are examples of the fuzzy variables "small 1" and "big 1", the membership functions as shown in FIG. 27 are examples of the fuzzy variables "small 2" and "big 2", the membership functions as shown in FIG. 28 are examples of the fuzzy variables "small 3" and "big 3", and the membership functions as shown in FIG. 29 are examples of the fuzzy variables "small 4" and "big 4", respectively.

Further, in the above formula 12, $a_{j,k}$ ($1 \leq j \leq 16$, $1 \leq k \leq 5$) are parameters for representing the output values of the respective fuzzy rule decisions by linear input-output expressions, which are decided empirically. In the above embodiment 6, since the consequent of the fuzzy rules is represented by the input-output expressions as shown by the formula 12, there exists such an advantage that the rule description capability is high.

FIG. 30 shows the practical examples of the parameters $a_{j,k}$. $P_{1a}=Va^2/(Vp*4)$; $P_{1p}=Va/4$; $P_{2a}=-Va*Vp/Vt*4)$; $P_{2p}=Vp^2/(Vt*4)$; $P_{3a}=Va/(SCV*4)$; $P_{3p}=Vp/(SCV*4)$; $P_{4a}=Va*N/4$; $P_{4p}=Vp*N/4$; Va represents AVG SPEED OF COMM SERVICE; Vp represents MAX SPEED OF COMM SERVICE; Vt represents XMSN LINE SPEED; N represents NUMBER OF MULTIPLEX CALLS OF SAME QTY CLASS DURING COMM; and SVC represents SQUARE FLUCTUATE COEFF.

The adaptabilities ω1 to ω16 of the respective fuzzy rules defined by the formula 12, the respective fuzzy variables represented by the respective membership functions shown in FIGS. 26 to 29 and the respective parameter values as shown in FIG. 30 are expressed as follows:

[Formula 13]
ω1 = small 1 (x1)*small 2 (x2)*small 3 (x3)*small 4 (x4)
ω2 = small 1 (x1)*small 2 (x2)*small 3 (x3)*big 4 (x4)
ω3 = small 1 (x1)*small 2 (x2)*big 3 (x3)*small 4 (x4)
ω4 = small 1 (x1)*small 2 (x2)*big 3 (x3)*big 4 (x4)
ω5 = small 1 (x1)*big 2 (x2)*small 3 (x3)*small 4 (x4)
ω6 = small 1 (x1)*big 2 (x2)*small 3 (x3)*big 4 (x4)
ω7 = small 1 (x1)*big 2 (x2)*big 3 (x3)*small 4 (x4)
ω8 = small 1 (x1)*big 2 (x2)*big 3 (x3)*big 4 (x4)
ω9 = big 1 (x1)*small 2 (x2)*small 3 (x3)*small 4 (x4)
ω10 = big 1 (x1)*small 2 (x2)*small 3 (x3)*big 4 (x4)
ω11 = big 1 (x1)*small 2 (x2)*big 3 (x3)*small 4 (x4)
ω12 = big 1 (x1)*small 2 (x2)*big 3 (x3)*big 4 (x4)
ω13 = big 1 (x1)*big 2 (x2)*small 3 (x3)*small 4 (x4)
ω14 = big 1 (x1)*big 2 (x2)*small 3 (x3)*big 4 (x4)
ω15 = big 1 (x1)*big 2 (x2)*big 3 (x3)*small 4 (x4)

ω16=big 1 (x1)*big 2 (x2)*big 3 (x3)*big 4 (x4)

Here, "small 1 (x1) is a grade of the fuzzy variable "small 1" at x1, "small 2 (x2) is a grade of the fuzzy variable "small 2" at x2, "small 3 (x3) is a grade of the fuzzy variable "small 3" at x3, and "small 4 (x4) is a grade of the fuzzy variable "small 4" at x4. The same as above can be applied to "big 1 (x1)", "big 2 (x2)", "big 3 (x3)" and "big 4 (x4)".

Accordingly, the estimation value y of the band allocation can be expressed as

[Formula 14]
$$y = \left(\sum_{i=1}^{16} \omega i * Yi\right) / \sum_{i=1}^{16} \omega i$$

In the embodiment 6 of the present invention, the output values (estimated results) y1 to y16 and the adaptabilities ω1 to ω16 of the respective fuzzy rules R1 to R16 are calculated by the fuzzy rule deciding unit 205 shown in FIG. 9 in accordance with the formulae 12 and 13, and the estimation value y of the band allocation is calculated by the value estimating section 216 in accordance with the formula 14.

Further, the connection admission control section 12 as described in the embodiment 2 controls the call acceptance on the basis of the estimated value y of the band allocation.

The more practical connection admission operation based upon the band estimation principle by fuzzy control of the embodiment 6 will be described hereinbelow.

Figure 31:
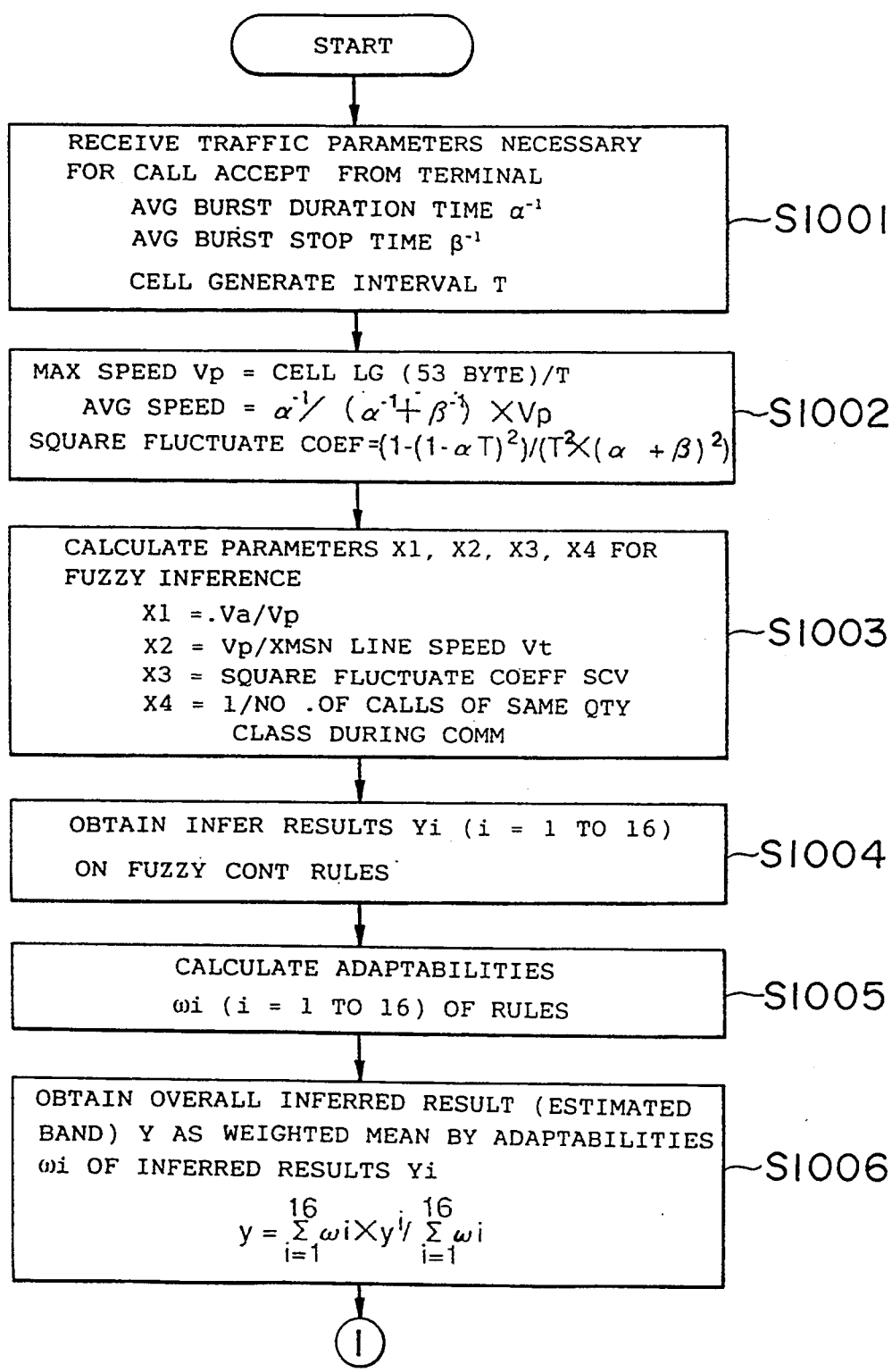
FIG. 31 is a first flowchart for assistance in explaining the operation of the embodiment 6.
Figure 32:
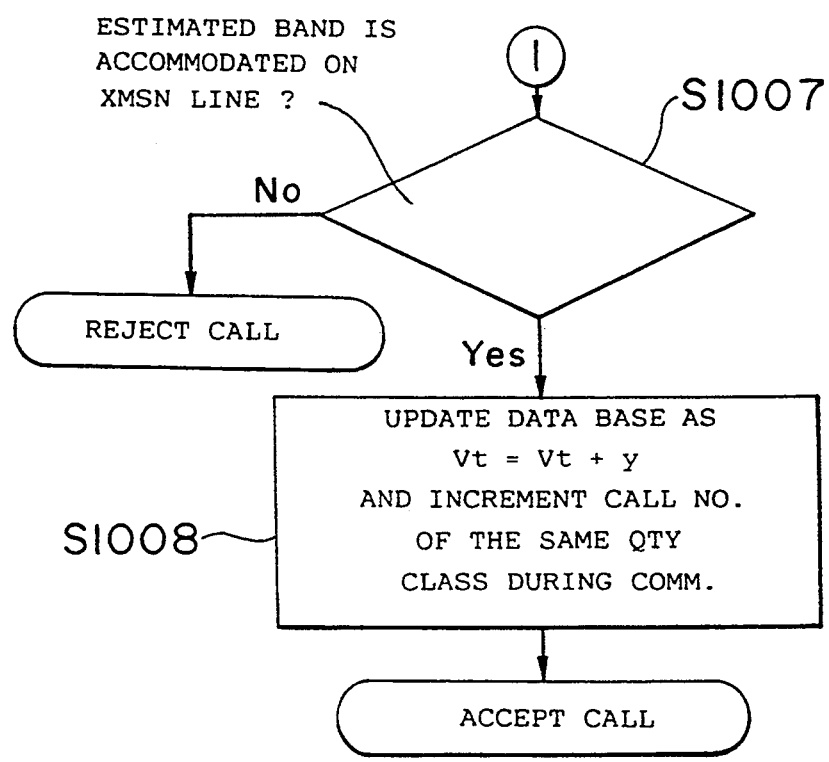
FIG. 32 is a second flowchart for assistance in explaining the operation of the embodiment 6.

FIG. 31 is a flowchart showing the operation executed by programs stored in a memory (not shown) of the call processing system 213 shown In FIG. 7 In the embodiment 2.

First, the connection admission control section 12 (shown in FIG. 18) receives the traffic parameters necessary for connection admission from the terminal 1 (shown in FIG. 7) (in step S1001). As the traffic parameters, the three parameters of an average burst duration period $\alpha^{-1}$ (sec), an average burst stop time period $\beta^{-1}$ (sec), and a cell generation interval T (c) are stated by the user.

Successively, the connection admission control section 12 calculates the three parameters of the maximum speed Vp, the average speed Va and the square fluctuation coefficient SCV on the basis of the three traffic parameters and in accordance with the following formulae 15, 16 and 17 (in step S1002).

[Formula 15]
$$Vp = Cell\ length\ (53\ Byte)/T$$

[Formula 16]
$$Vs = \alpha^{-1}/(\alpha^{-1}+\beta^{-1})*Vp$$

[Formula 17]
Square fluctuation coefficient
$$SCV = (1-(1-\alpha T)^2)/(T^2*(\alpha+\beta)^2)$$

α: Reciprocal number of average burst duration time
β: Reciprocal number of average burst stop time
T: Cell generation interval Further, the call acceptance control section 12 calculates four parameters x1 to x4 to be inputted to the fuzzy rules on the basis of the three above-mentioned parameters (the maximum speed Vp, the average speed Va and the square fluctuation coefficient SCV), the transmission line speed Vt and the number of calls of the same quality in communications read from the traffic information data base 215, and in accordance with the formula 11 (in step S1003).

Here, there are all shown below the numerical examples of the maximum speed Vp, the average speed Va, and the square fluctuation coefficient SCV calculated In accordance with the formulae 15 to 17; the transmission line speed Vt and the number of calls of the same quality in communications read from the traffic information data base 215; and the four parameters x1 to X4 calculated on the basis of these:

[Formula 18]
In the case where:
 Maximum speed = 1 Mb/s
 Average speed = 0.5 Mb/s
 Square fluctuation coefficient = 20
 Transmission line speed = 150 Mb/s
 Number of calls of same quality in comm. = 20

$x1$ = Average speed/Maximum speed = 0.5/1.0 = 0.5

$x2$ = Maximum speed/Transmission speed = 1/150 = 0.007

$x3$ = Square fluctuation coefficient = 20

$x4$ = 1/Number of calls of same quality in comm. = 0.05

The connection admission control section 12 transmits the above four parameters x1 to x4 to the fuzzy rule deciding section 205 of the fuzzy control section 11. At the same time, the connection admission control section 12 calculates the parameters $a_{j,k}$ ($1 \leq j \leq 16$, $1 \leq k \leq 5$) used for fuzzy rules shown in the formula 12 and on the basis of the table shown in FIG. 30, and writes the calculated parameters in the fuzzy rule deciding parameter memory 217 of the fuzzy control section 11 as shown in FIG. 9. Further, the connection admission control section 12 stores previously the membership functions (fuzzy variables) as shown in FIGS. 26 to 29, for instance used for the fuzzy rules of the formula 12 into the membership function storing section 218 of the fuzzy control section 11 as shown in FIG. 9.

In the case of the numerical values shown In the formula 18, the respective numerical value examples for constituting the parameters $a_{j,k}$ ($1 \leq j \leq 16$, $1 \leq k \leq 5$) calculated on the basis of the table as shown in FIG. 30 are as follows:

[Formula 19]

$P_{1a} = Vp/4 = 1.0/4 = 0.25$ $P_{1p} = Vp*Vp/(Va*4) = 1.0*1.0/(0.5*4) = 0.5$ $P_{2a} = Va*Vt/Vp*4 = 0.5*150/(1.0*4 = 18.75$ $P_{2p} = Vt/4 = 150/4 = 37.5$ $P_{3a} = Va/(SVC*4) = 0.5/(20*4) = 0.00625$ $P_{3p} = Vp/(SVC*4) = 1.0/(20*4) = 0.0125$ $P_{4a} = Va*N/4 = 0.5*20/4 = 2.5$ $P_{4p} = Vp*N/4 = 1.0*20/4 = 5$

Successively, the fuzzy deciding section 205 shown in FIG. 9 first calculates the output values (estimated results) y1 to y16 of the respective fuzzy rules R1 to R16 of the formula 12 on the basis of the four parameters x1 to x4 transmitted from the connection admission control section 12, the fuzzy deciding parameters $a_{j,k}$ ($1 \leq j \leq 16$, $1 \leq k \leq 5$) (see FIG. 30) read from the fuzzy deciding parameter memory 217, and the membership functions (see FIGS. 26 to 29) of the respective fuzzy variables read from the membership function storing section 218 (in step S1004).

In the case of the numerical values of the formulae 18 and 19, the output value y1 is calculated as follows:

[Formula 20]
$$\begin{aligned}
y1 &= a_{1.1} * x1 + a_{1.2} * x2 + a_{1.3} * x3 + a_{1.4} * x4 + a_{1.5} \\
&= P_{1a} * 0.5 + P_{2a} * 0.007 + P_{3a} * 20 + P_{4a} * 0.05 \\
&= 0.025 * 0.5 + 18.75 * 0.007 + 0.00625 * 20 + 2.5 * 0.05 \\
&= 0.39375
\end{aligned}$$

In the same way as above, the output values y2 to y16 are calculated as:
[Formula 21]
y2=0.51875, y3=0.51875, y4=0.64375, y5=0.525, y6=0.65, y7=0.65, y8=0.64375, y9=0.63125, y10=0.75625, y11=0.75625, y12=0.88125, y13=0.7625, y14=0.8875, y15=0.8875, y16=1.0125

Thereafter, the fuzzy deciding section 205 calculates the adaptabilities ω1 to ω16 of the respective fuzzy rules R1 to R16 as expressed by the formula 13 on the basis of the four parameters x1 to x4 and the membership functions (see FIGS. 26 to 29) of the respective variables read from the membership function storing section 218 (in step S1005).

In the case of the numerical values of the formulae 18 and 19, the adaptabilities ω1 to ω2 are calculated as follows:
[Formula 22]
ω1=small 1 (0.5)*small 2 (0.007)*small 3 (20)*small 4 (0.05)=0*0.93*0.4*0.56=0
ω2=small 1 (0.5)*small 2 (0.007)*small 3 (20)*big 4 (0.05)=0*0.93*0.4*0.45=0

In the same way, the adaptabilities ω3 to ω16 are calculate as follows:
[Formula 23]
ω3=0, ω4=0, ω5=0, ω6=0, ω7=0, ω8=0, ω9=0.208, ω10=0.167, ω11=0.312, ω12=0.251, ω13=0, ω14=0, ω15=0, ω16=0.

The fuzzy rule deciding section 205 outputs the output values y1 to y16 and the adaptabilities ω1 to ω16 of the respective fuzzy rules R1 to R14 obtained as described above to the band allocation estimating section 216.

The band allocation estimating section 216 calculates the band allocation estimation value y of the formula 14 on the basis of the numerical values of the formulae 18 to 21 (in step S1006).

In the case of the numerical values of the formulae 18 to 21, the band allocation estimation value y is calculated as follows:

[Formula 24]
$$y = \left( \sum_{i=1}^{16} \omega i * Yi \right) / \sum_{i=1}^{16} \omega i$$

$$\begin{aligned}
&= (0.208 * 0.63125 + 0.167 * 0.75625 + 0.312 * 0.75625 + \\
&\quad 0.251 * 0.88125)/(0.208 + 0.167 + 0.312 + 0.251) \\
&= 0.7147375/0.941 \\
&= 0.7595 \text{ Mb/s}
\end{aligned}$$

The band allocation estimating section 216 sends the band allocation estimation value y obtained as described above to the connection admission control section 12 shown in FIG. 8.

The connection admission control section 12 accepts the call from the subscriber (B-ISDN terminal 1) when the above-mentioned band allocation estimation value can be accommodated by the transmission line, and rejects the call when not accommodated (in step S1007).

Once the call from the subscriber is accepted, the connection admission control section 12 updates the transmission line speed Vt by adding the band allocation estimation value y to the speed Vt, and further increments the sum of the calls of the same quality class during communications. The connection admission control section 12 updates the contents of the traffic information data base 215 on the basis of the updated results.

In the above-mentioned embodiments as described above, the membership functions stored In the membership function storing section 218 are of fixed characteristics as shown in FIGS. 26 to 29. Without being limited thereto, however, it is possible to update the membership functions stored in the membership function storing section 218, by outputting a membership function updating information data to the membership function storing section 12 on the basis of the updated contents of the traffic information data base 215.

Further, in the embodiment 6, although four parameters x1 to x4 expressed by the formula 11 are used as the inputs to the fuzzy rules, it is possible to input various parameters to the fuzzy rules by determining the traffic parameters stated by the subscriber and the traffic parameters of the current network.

In addition, in the embodiment 6, although "small" and "big" are used as the fuzzy variables, it is of course possible to apply the three or more fuzzy variables to the fuzzy rules.

Figure 12A:
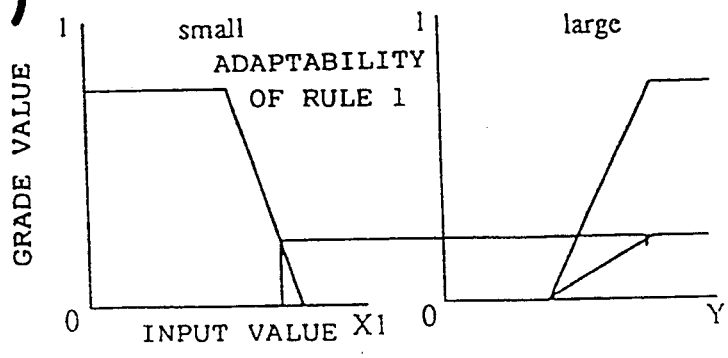
FIG. 12(a)-12(c) are graphical representations for assistance in explaining the if-then rules of the fuzzy theory.
Figure 12B:
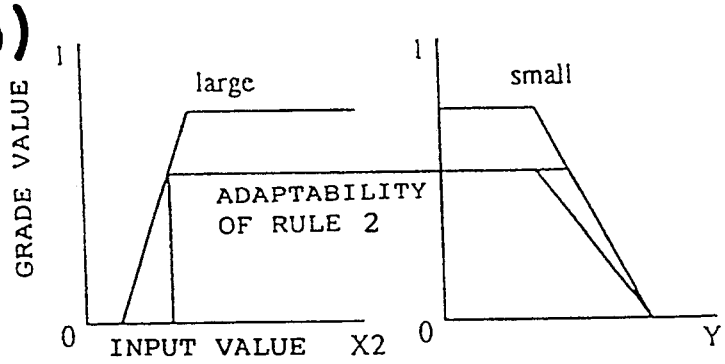
Figure 12C:
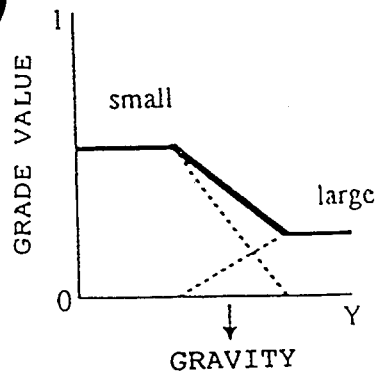

Furthermore, in the embodiment 6, although the linear coupling expression as shown in FIG. 12 is used for the consequent of the fuzzy rules, other input-output expressions can be of course available.

What is claimed is:

1. A connection admission control system comprising:

a plurality of B-ISDN terminal means each for transmitting a call connection request and traffic parameters in call origination;

ATM switching means connected to each of said B-ISDN terminal means, for receiving one of said call connection requests from one of said plurality of B-ISDN terminal means;

central control means for controlling an internal line switching of said ATM switching means;

call acceptance control means provided in said central control means, for executing a switching routine and a band allocation in response to a statement of the traffic parameters received from said one of said plurality of B-ISDN terminal means; and fuzzy control means provided in said central control means, for analyzing the traffic parameters received by said call acceptance control means, for calculating a necessary band in accordance with fuzzy rules, and for discriminating whether a call setup for the call, based on the call connection request, is acceptable or not.

2. The connection admission control system of claim 1, wherein said fuzzy control means further estimates the call band required by said B-ISDN terminal means in response to the traffic parameters stated by said B-ISDN terminal and in accordance with the fuzzy rules referred to as indirect method.

3. The connection admission control system of claim 1, wherein said fuzzy control means further executes the fuzzy control by use of linear membership functions expressed by $(x)=x$, $N(x)=P(-x)$ as fuzzy variables.

4. The connection admission control system of claim 1, wherein said fuzzy control means further executes the fuzzy control by use of arc tangent membership functions expressed by $P(x)=(1/\pi) \tan-1 (ax)$, $N(x)=P(-x)$ as fuzzy variables.

5. The connection admission control system of claim 1, wherein said fuzzy control means further converts fuzzy sets of the final inference results into a final band allocation value on the basis of weighted mean by adaptabilities w of the respective inferences.

6. The connection admission control system of claim 1, wherein the membership functions used as variables for inference by said fuzzy control means are determined empirically.

7. The connection admission control system of claim 1, wherein said fuzzy control means receives the traffic parameters from said B-ISDN terminal as a connection admission algorithm, further calculates adaptabilities $\omega$ of the fuzzy control rules, calculates inferred results y of fuzzy control rules on the basis of the adaptabilities $\omega$ and membership functions of consequent, obtains an overall inferred result as weighted means of the inferred results y and the adaptabilities $\omega$, and discriminates whether the inferred result can be accommodated in the transmission line.

8. The connection admission control system of claim 1, wherein said fuzzy control means comprises:
   fuzzy rule deciding means for executing decision processing on the basis of the traffic parameters transmitted by said connection admission control means; and
   fuzzy rule storing means for storing parameters, calculation formulae and membership functions for fuzzy rule decision.

9. The connection admission control system of claim 8, wherein said fuzzy rule storing means further stores antecedent membership functions for representing fuzzy expressions of input signals as numerical values, consequent membership functions for representing fuzzy expressions of output signals as numerical values, and rules for developing coupling relationship between the antecedent and the consequent of the membership functions in if-then fashion; and
   said fuzzy control means further converts the traffic parameters of the input signals into numerical values on the basis of the antecedent membership functions; calculates the consequent membership functions corresponding to the obtained numerical values in accordance with the rules, and outputs a band allocation value on the basis of the consequent membership functions thereof.

10. The connection admission control system of claim 1, wherein when said B-ISDN terminal means further requests a call connection including traffic parameters to said ATM switching means, said call acceptance control means further has an access to said fuzzy control means, calculates the adaptabilities of the respective rules on the basis of the fuzzy control rules stored in said fuzzy control means calculates, inferred results of the respective rules on the basis of the calculated adaptabilities, obtains a fuzzy set of the overall inferred result on the basis of the inferred results, converts the fuzzy set into an estimated band value, and accepts the call processing of the call request only when the estimated band value can be accommodated on the transmission line.

11. The connection admission control system of claim 10, wherein the traffic parameters include at least a peak speed and an average speed of communications requested.

12. The connection admission control system of claim 10, wherein the fuzzy control rules are represented by discrete membership functions.

13. The connection admission control system of claim 10, wherein the fuzzy control rules are represented by continuous membership functions.

14. The connection admission system of claim 1, wherein in the consequent of the respective fuzzy rules used by said fuzzy control means, the respective estimated band values are represented by linear couplings in which the respective input values are coupled to each other through predetermined linear parameters.

15. A connection admission control system, which comprises ATM switching means for securing a network line band on the basis of a call connection request from a B-ISDN terminal means for transmitting the call connection request to the ATM switching means, comprising:
   call acceptance control means for executing a switching routine and a band allocation in response to a statement of traffic parameters transmitted from said B-ISDN terminal means;
   fuzzy control means accessed by said call acceptance control means, for estimating a call band of the call connection request in accordance with fuzzy rules;
   cell traffic measuring means for observing a status of cell traffic transmitted from said B-ISDN terminal means; and
   a traffic information database for storing information related to a transmission line band; and
   said cell traffic measuring means observing the status of cell traffic incoming from the B-ISDN terminal means, and further calculating an estimated band value on the basis of the traffic parameters obtained from the incoming cell traffic status and in accordance with the fuzzy rules of said fuzzy control means, and further updating a traffic information database on the basis of the estimated band value.

16. The connection admission control system of claim 15, wherein one of the parameters obtained by the incoming status is a cell incoming interval of constant calls in a constant time period.

17. The connection admission control system of claim 15, wherein one of the parameters obtained by the incoming status is the number of cells of constant calls incoming in a constant time period.

18. The connection admission control system of claim 15, wherein one of the parameters obtained by the incoming status is the number of multiplex calls having the same traffic characteristics as constant calls.

19. The connection admission control system of claim 15, wherein said call acceptance control means further:
   in response to the call connection request from said B-ISDN terminal means, discriminates whether the call is a first call origination with reference to the traffic information data base;
   if the call is the first call origination, allocates a necessary maximum band to the call and further checks whether the allocated band can be accommodated by the actual transmission line;

if the allocated band can be accommodated, accepts the call on the basis of the allocated band;

observes the cell incoming status of the cell by said cell traffic measuring means; and executes fuzzy interference by application of the fuzzy rules of said fuzzy control means on the basis of the observed results, calculates an optimum estimated band value, and changes the maximum band now allocated to the transmission line to the optimum estimated band value.

20. The connection admission control system of claim 19, wherein said connection admission control means further updates the traffic information data base on the basis of the estimated band value calculated on the basis of the measured results of said cell traffic measuring means, and accepts the succeeding same call from the same B-ISDN terminal on the basis of the estimated band value registered in the traffic information data base.

21. A call acceptance method having fuzzy control means for analyzing traffic parameters, for calculating a necessary band in accordance with fuzzy rules, and for discriminating whether a call set up for the call is acceptable, comprising the following steps of:

inputting traffic parameters stated from each B-ISDN terminal and parameters xk ($1 \leq k \leq m$, m: natural numbers) decided by the traffic parameters indicative of network traffic status at a call request from the B-ISDN terminal;

calculating respective band estimation values yi ($1 \leq i \leq n$) on the basis of n-piece fuzzy rules R1, ... Rn composed of antecedents of fuzzy variables represented by predetermined membership functions Mj,k ($0 \leq j \leq n$, $0 \leq k \leq m$, m, n: natural numbers) and consequents in which the band estimation values yi ($1 \leq i \leq n$) of outputs are represented by functions fi (xk) ($1 \leq i \leq n$) of the input xk ($1 \leq k \leq m$) as:

[Formula 1]

R1 = if x1 is M11 and x2 is M12 and ... xm is $M_{1m}$ then $y1 = f1\ (x1, x2, \ldots xm)$ R2 = if x1 is M21 and x2 is M22 and ... xm is $M_{2m}$ then $y2 = f2\ (x1, x2, \ldots xm)$ Ri = if x1 is Mi1 and x2 is Mi2 and ... xm is $M_{1m}$ then $yi = fi\ (x1, x2, \ldots xm)$ Rn = if x1 is Mn1 and x2 is Mn2 and ... xm is $M_{2m}$ then $yn = fn\ (x1, x2, \ldots xm)$ calculating adaptabilities $\omega i$ ($1 \leq i \leq n$) in accordance with a formula as

[Formula 2]
$$\omega i = \prod_{K=1}^{n} Mik(Xi)$$

where Mik (xi) denotes grades of fuzzy variables Mik at xi;

estimating an estimated value y corresponding to the B-ISDN terminal (1) by calculation on the basis of the band estimation values yi ($1 \leq i \leq n$) and the adaptabilities $\omega i$ ($1 \leq i \leq n$) of the respective fuzzy rules R1, ... Rn and in accordance with a formula as

[Formula 3]
$$y = \left( \sum_{i=1}^{n} \omega i * yi \right) / \sum_{i=1}^{n} \omega i$$

and discriminating acceptance or rejection of the call from the B-ISDN terminal on the basis of the estimated band allocation value.

22. The connection admission control system of claim 21, wherein in the consequents of the respective fuzzy rules, the function fi (xk) ($1 \leq k \leq m$, $1 \leq i \leq n$) corresponding to the respective band estimation value yi are expressed by linear coupling expressions as $$fi\ (x1, x2, \ldots xm) = a_{1,1} x1 + a_{1,2} x2 \ldots$$
$$+ a_{i,m} x_m + a_{i,m+1}$$

where ai,k, ($1 \leq k \leq m+1$) are linear parameters.

23. The connection admission control system of claim 21, wherein one of the parameters decided on the basis of the traffic parameters stated by the B-ISDN terminal and the traffic parameters indicative of the network traffic status is a ratio of an average speed during communications of the B-ISDN terminal to a maximum speed during communications of the B-ISDN terminal.

24. The connection admission control system of claim 21, wherein one of the parameters decided on the basis of the traffic parameters stated by the B-ISDN terminal and the traffic parameters indicative of the network traffic status is a ratio of a maximum speed during communications of the B-ISDN terminal to a transmission speed of network transmission capacity.

25. The connection admission control system of claim 21, wherein one of the parameters decided on the basis of the traffic parameters stated by the B-ISDN terminal and the traffic parameters indicative of the network traffic status is a square fluctuation coefficient.

26. The connection admission control system of claim 21, wherein one of the parameters decided on the basis of the traffic parameters stated by the B-ISDN terminal and the traffic parameters indicative of the network traffic status is an inverse number of multiplex calls of the same quality class in network.

27. The connection admission control system of claim 21, wherein said connection admission control means updates the number of multiplex calls of the same quality calls in network, when accepting the call of the B-ISDN terminal in accordance with the band allocated value estimated by said band allocation estimating means.

28. The call accepting control system of claim 21, wherein the membership functions of the respective fuzzy variables in the antecedents of the respective fuzzy rules are decided on the basis of traffic conditions of network.

29. The call accepting control system of claim 21, wherein the respective linear parameters in the antecedents of the respective fuzzy rules are decided on the basis of traffic conditions of network.

* * * * *

UNITED STATES PATENT AND TRADEMARK OFFICE
CERTIFICATE OF CORRECTION

PATENT NO. : 5,341,366
DATED : August 23, 1994
INVENTOR(S) : Toshio SOUMIYA et al.

It is certified that error appears in the above-indentified patent and that said Letters Patent is hereby corrected as shown below:

TITLE PAGE [57] ABSTRACT

Line 14, "Inputs" should be --inputs--.

Column 1

Line 42, "bond" should be --band--.

Column 3

Line 46, "In" should be --in--.

Column 4

Line 56, "Illustrations" should be --illustrations--.

Column 8

Line 41, "Information" should be --information--;

Line 58, "In" should be --in--;

Line 62, "Introduce" should be --introduce--.

Column 9

Line 46, delete "32".

UNITED STATES PATENT AND TRADEMARK OFFICE
CERTIFICATE OF CORRECTION

PATENT NO. : 5,341,366
DATED : August 23, 1994
INVENTOR(S) : Toshio SOUMIYA et al.

It is certified that error appears in the above-indentified patent and that said Letters Patent is hereby corrected as shown below:

Column 10

Line 29, "If" should be --if--.

Column 12

Line 54, "In" should be --in--.

Column 14

Line 21, "In" should be --in--.

Column 15

Line 50, "$P_2a$" should be --$P_2p$--;

Column 19

Line 19, "unit" should be --means--;

Line 33, "In" should be --in--.

UNITED STATES PATENT AND TRADEMARK OFFICE
CERTIFICATE OF CORRECTION

PATENT NO. : 5,341,366
DATED : August 23, 1994
INVENTOR(S) : Toshio SOUMIYA et al.

It is certified that error appears in the above-indentified patent and that said Letters Patent is hereby corrected as shown below:

Column 20

Line 6, "In" should be --in--;

Line 43, "In" should be --in--.

Column 22

Line 18, "In" should be --in--.

Column 23 (Claim 10)

Line 67, change "means", to --means,--; and after "calculates" delete ",".

Signed and Sealed this

Eighteenth Day of April, 1995

BRUCE LEHMAN

*Commissioner of Patents and Trademarks*

*Attest:*

*Attesting Officer*